US012189438B2

United States Patent
Hinson et al.

(10) Patent No.: US 12,189,438 B2
(45) Date of Patent: *Jan. 7, 2025

(54) KNOB ON DISPLAY

(71) Applicant: Atmel Corporation, Chandler, AZ (US)

(72) Inventors: Nigel Hinson, Hants (GB); Gareth Michael Jones, Salisbury (GB)

(73) Assignee: Atmel Corporation, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/168,468

(22) Filed: Feb. 13, 2023

(65) Prior Publication Data

US 2023/0195185 A1 Jun. 22, 2023

Related U.S. Application Data

(63) Continuation of application No. 16/947,326, filed on Jul. 28, 2020, now Pat. No. 11,579,665.
(Continued)

(51) Int. Cl.
*G06F 1/16* (2006.01)
*G05G 9/047* (2006.01)
(Continued)

(52) U.S. Cl.
CPC ............ *G06F 1/169* (2013.01); *G05G 9/047* (2013.01); *G06F 3/0354* (2013.01);
(Continued)

(58) Field of Classification Search
CPC ......... G06F 2203/04103; G06F 3/0443; G06F 3/0412; G06F 3/0445; G06F 3/0446;
(Continued)

(56) References Cited

U.S. PATENT DOCUMENTS 4,158,216 A   6/1979   Bigelow
5,936,613 A   8/1999   Jaeger et al.
(Continued)

FOREIGN PATENT DOCUMENTS

CA        2699363 A1    10/2010
CN      102402324 A     4/2012
(Continued)

OTHER PUBLICATIONS

Chinese First Office Action for Chinese Application No. 202080057323.8, dated Sep. 15, 2023, 58 pages with translation.
(Continued)

*Primary Examiner* — William Boddie
*Assistant Examiner* — Alecia D English
(74) *Attorney, Agent, or Firm* — TraskBritt

(57) ABSTRACT

One or more examples relate to a knob-on-display. An apparatus of such a knob-on-display includes a touch surface, a dome switch pad, a dome switch, a rotation electrode pad, and an electrically conductive structure. The touch surface may include an electrically conductive material, the touch surface movable to a released position and to a depressed position. The dome switch may include an electrically conductive material. The dome switch may be physically mounted to and electrically connected to the dome switch pad. The rotation electrode pad may be in engagement proximity to a touch sensor of a touch screen device in both the released position and the depressed position. The electrically conductive structure may be physically and electrically connected to the dome switch pad and the rotation electrode pad, the electrically conductive structure defining a continuous electrically conductive path from the rotation electrode pad, through the dome switch, to the electrically conductive material of the touch surface in both the released position and the depressed position.

21 Claims, 29 Drawing Sheets

Related U.S. Application Data

(60) Provisional application No. 62/901,383, filed on Sep. 17, 2019, provisional application No. 62/887,657, filed on Aug. 15, 2019.

(51) Int. Cl.
  *G06F 3/0354* (2013.01)
  *G06F 3/0362* (2013.01)
  *G06F 3/041* (2006.01)

(52) U.S. Cl.
  CPC .......... *G06F 3/0362* (2013.01); *G06F 3/0412* (2013.01); *G06F 3/0414* (2013.01); *G05G 2009/0474* (2013.01); *G05G 2009/04766* (2013.01); *G06F 2203/04103* (2013.01); *G06F 2203/04106* (2013.01)

(58) Field of Classification Search
  CPC ....... G06F 3/04164; G06F 2203/04102; G06F 2203/04111; G06F 3/041; G06F 1/1652; G06F 1/189; G06F 2203/04112; G06F 3/044
  See application file for complete search history.

(56) References Cited

U.S. PATENT DOCUMENTS

| | | |
|---|---|---|
| 7,414,205 B1 | 8/2008 | Heinrich et al. |
| 8,199,114 B1 | 6/2012 | Jaeger et al. |
| 10,866,619 B1 | 12/2020 | Bushnell et al. |
| 10,921,913 B1 | 2/2021 | Fong et al. |
| 11,579,665 B2 * | 2/2023 | Hinson ............... G05G 9/047 |
| 2004/0253931 A1 | 12/2004 | Bonnelykke et al. |
| 2010/0026532 A1 | 2/2010 | Shimizu et al. |
| 2010/0214262 A1 | 8/2010 | Ishizaki et al. |
| 2010/0252335 A1 | 10/2010 | Orsley |
| 2010/0265197 A1 | 10/2010 | Purdy et al. |
| 2011/0298721 A1 | 12/2011 | Eldridge |
| 2012/0063101 A1 | 3/2012 | Schwartz et al. |
| 2012/0306802 A1 | 12/2012 | McCracken |
| 2013/0093702 A1 | 4/2013 | Argiro |
| 2013/0220779 A1 | 8/2013 | Kerner et al. |
| 2014/0042004 A1 | 2/2014 | Tseng |
| 2014/0062684 A1 | 3/2014 | Casparian et al. |
| 2014/0260776 A1 | 9/2014 | Burleson |
| 2015/0109243 A1 | 4/2015 | Jun et al. |
| 2016/0064167 A1 | 3/2016 | Lyszus et al. |
| 2017/0052617 A1 | 2/2017 | Okuzumi et al. |
| 2017/0102788 A1 | 4/2017 | Arceo et al. |
| 2017/0364205 A1 | 12/2017 | Chang et al. |
| 2018/0024649 A1 | 1/2018 | Uno |
| 2018/0046267 A1 | 2/2018 | Kobayashi |
| 2018/0081452 A1 | 3/2018 | Min et al. |
| 2019/0025944 A1 | 1/2019 | Konishi et al. |
| 2019/0080864 A1 | 3/2019 | Sawada et al. |
| 2019/0108953 A1 | 4/2019 | Dooley |
| 2019/0204983 A1 | 7/2019 | Huner et al. |
| 2019/0213363 A1 | 7/2019 | Sugiura et al. |
| 2019/0250740 A1 | 8/2019 | Okuzumi et al. |
| 2020/0073487 A1 | 3/2020 | Ballan et al. |
| 2020/0073513 A1 | 3/2020 | Ballan et al. |
| 2020/0079217 A1 | 3/2020 | Shiue et al. |
| 2020/0225804 A1 | 7/2020 | Ikegami et al. |
| 2020/0278761 A1 | 9/2020 | Takaoka et al. |
| 2020/0301547 A1 | 9/2020 | Mori et al. |
| 2020/0319772 A1 | 10/2020 | Asai |
| 2021/0048845 A1 | 2/2021 | Hinson et al. |
| 2021/0048846 A1 | 2/2021 | Hinson |
| 2021/0064152 A1 | 3/2021 | Tanaka |
| 2021/0200337 A1 * | 7/2021 | Takaoka ............... G06F 3/0393 |

FOREIGN PATENT DOCUMENTS

| | | |
|---|---|---|
| CN | 103629706 A | 3/2014 |
| CN | 103937669 A | 7/2014 |
| CN | 106462278 A | 2/2017 |
| CN | 107844205 A | 3/2018 |
| CN | 108475132 A | 8/2018 |
| CN | 109192587 A | 1/2019 |
| CN | 109858297 A | 6/2019 |
| DE | 102017125827 A1 | 5/2019 |
| EP | 3144783 A1 | 3/2017 |
| FR | 3056474 A1 | 3/2018 |
| JP | 2008-078022 A | 4/2008 |
| JP | 2009-301854 A | 12/2009 |
| JP | 2013-257807 A | 12/2013 |
| TW | 201407437 A | 2/2014 |
| WO | 2010/110532 A2 | 9/2010 |
| WO | 2010/134947 A1 | 11/2010 |
| WO | 2015/174092 A1 | 11/2015 |
| WO | 2016/075907 A1 | 5/2016 |
| WO | 2018/109833 A1 | 6/2018 |
| WO | 2018/109835 A1 | 6/2018 |

OTHER PUBLICATIONS

Chinese First Office Action for Chinese Application No. 202080057337.X, dated Sep. 22, 2023, 26 pages with translation.
Examination Notice for German Patent Application No. 11 2020 003 873.4, dated Nov. 20, 2023, 12 pages with translation.
Examination Notice for German Patent Application No. 11 2020 003 874.2, dated Nov. 17, 2023, 12 pages with translation.
International Search Report from International Application No. PCT/US2020/0070321, mailed Nov. 6, 2020, 5 pages.
International Written Opinion from International Application No. PCT/US2020/0070321, mailed Nov. 6, 2020, 8 pages.
Letter of Examination Report and Search Report of Taiwan Patent Application No. 109127646, issued Feb. 21, 2024, 14 pages with English translation.
Notification of Provisional Rejection of Korean Patent Application No. 10-2022-7006888, mailed Nov. 16, 2023, 12 pages with English translation.
Request for Submission of an Opinion for Korean Patent Application No. 10-2022-7006891, mailed Nov. 20, 2023, 15 pages with English translation.
Taiwan Notice of Office Action and Search Report for Taiwan Patent Application No. 109127644, issued Oct. 30, 2023, 17 pages with English translation.
Chinese Notification to Grant Patent Right for Invention and Search Report of Chinese Patent Application No. 202080057323.8, issued Feb. 21, 2024, 9 pages with English translation.
Chinese Notification to Grant Patent Right for Invention and Search Report of Chinese Patent Application No. 202080057337.X, issued Mar. 5, 2024, 9 pages with English translation.
International Search Report from International Application No. PCT/US2020/070319, mailed Nov. 9, 2020, 5 pages.
International Written Opinion from International Application No. PCT/US2020/070319, mailed Nov. 9, 2020, 9 pages.
German Examination Notice for German Patent Application No. 11 2020 003 873.4, mailed May 17, 2024, 6 pages with English machine translation.
Notice of Reasons for Refusal of Japanese Patent Application No. 2022-508497, issued Jul. 2, 2024, 12 pages with English translation.
Notice of Reasons for Refusal of Japanese Patent Application No. 2022-508498, issued Jul. 2, 2024, 7 pages with English translation.
Second Office Action and Search Report of Taiwan Patent Application No. 109127646, issued Jun. 25, 2024, 12 pages with English translation.

* cited by examiner

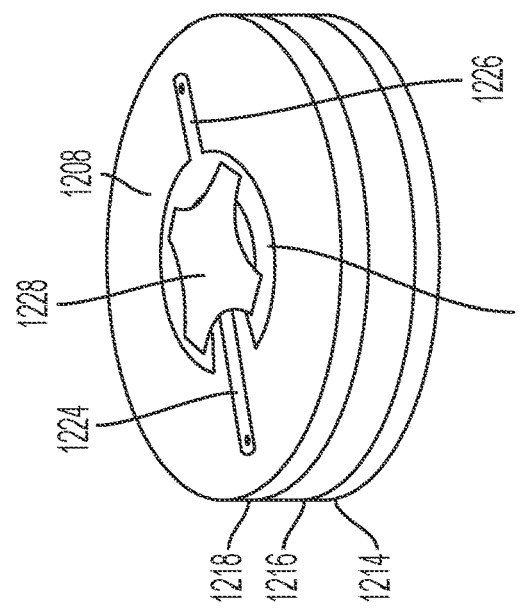
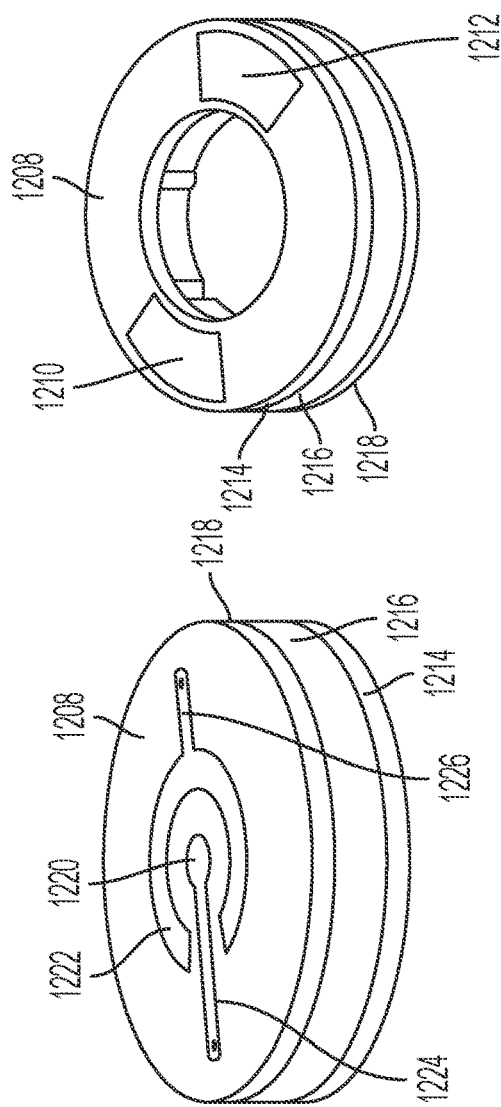

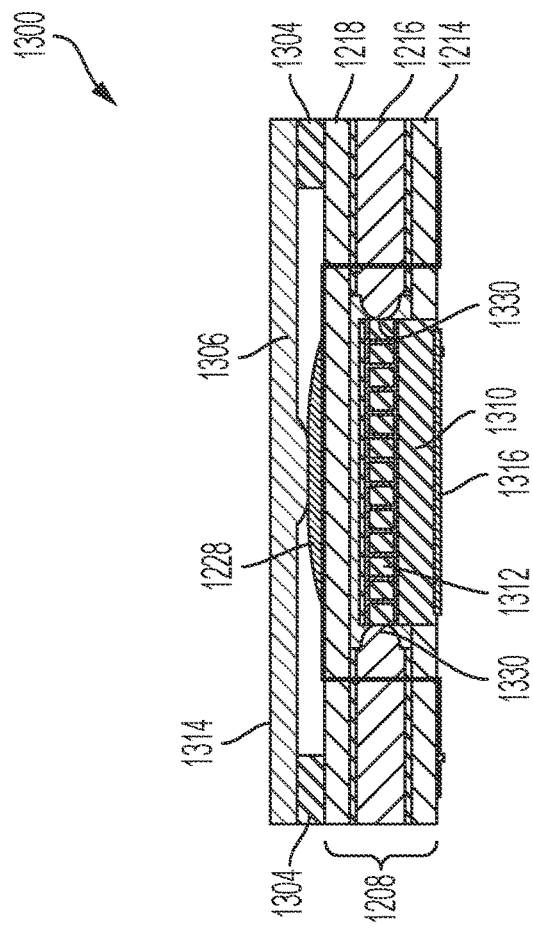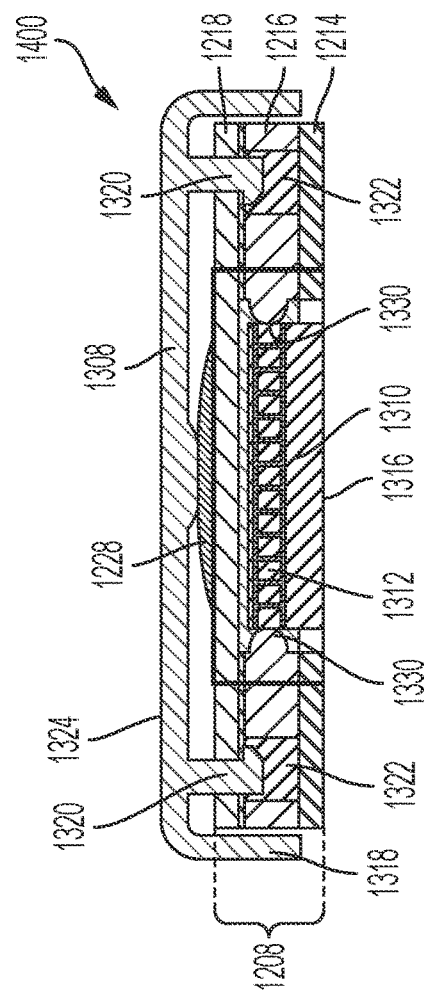

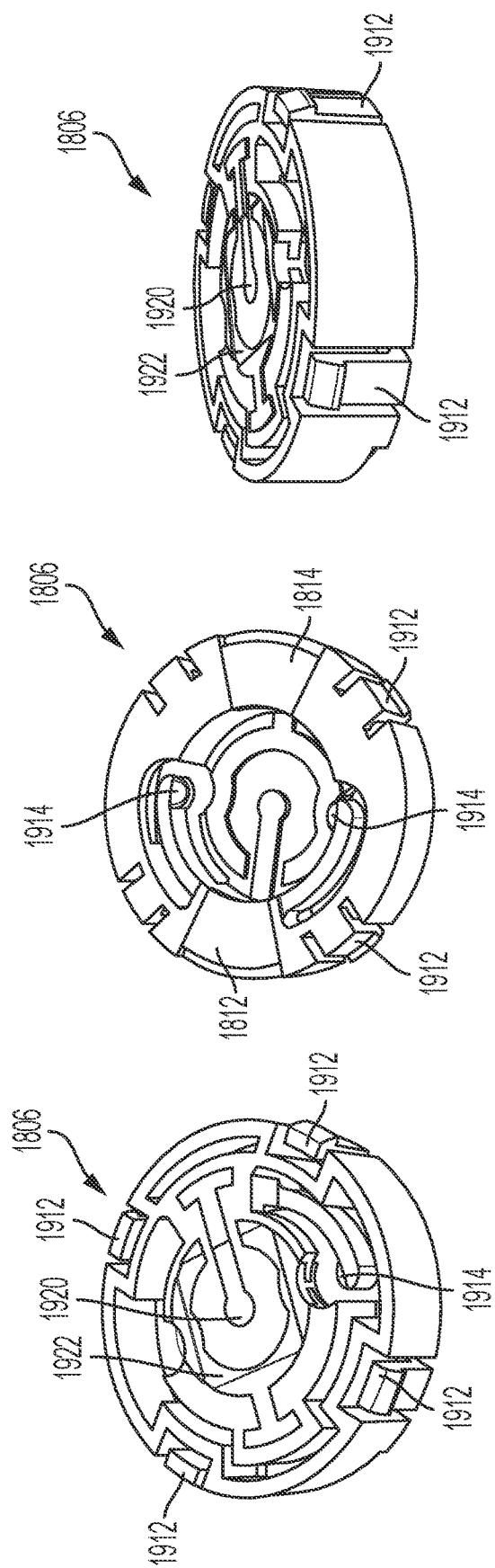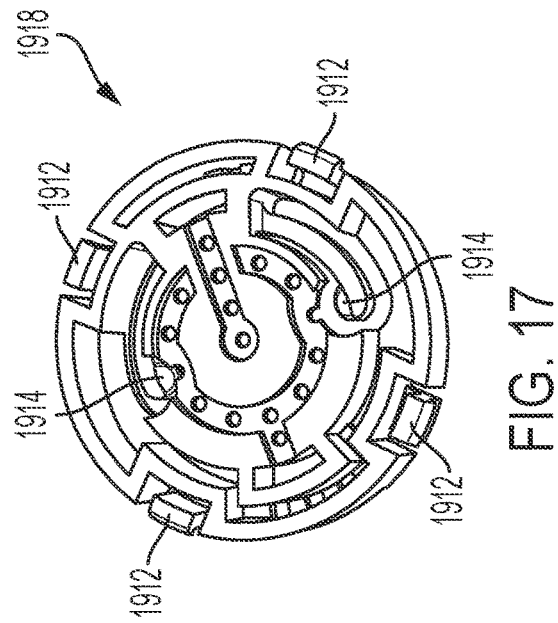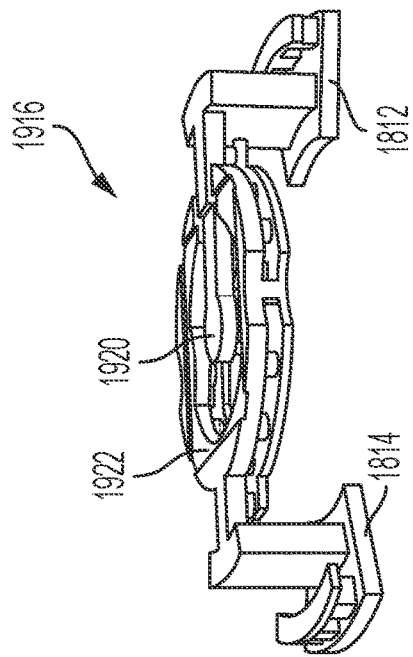

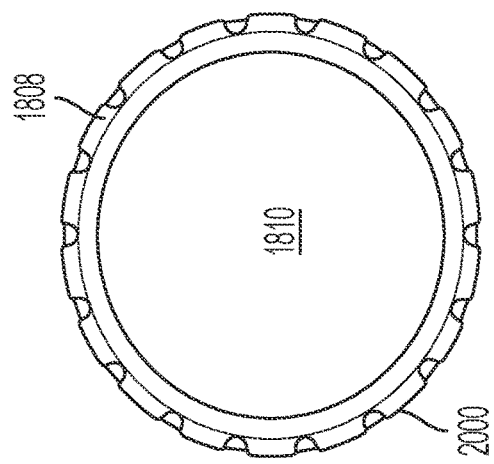
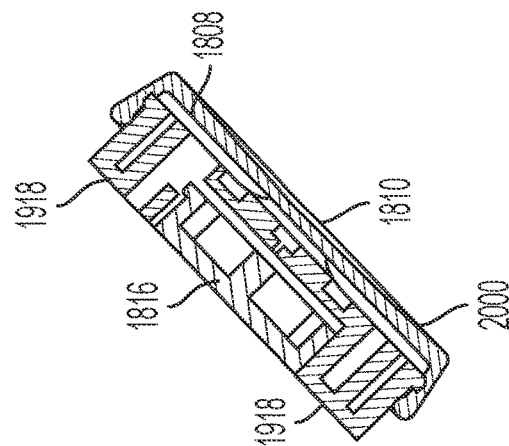
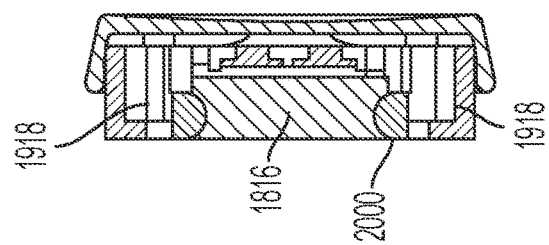
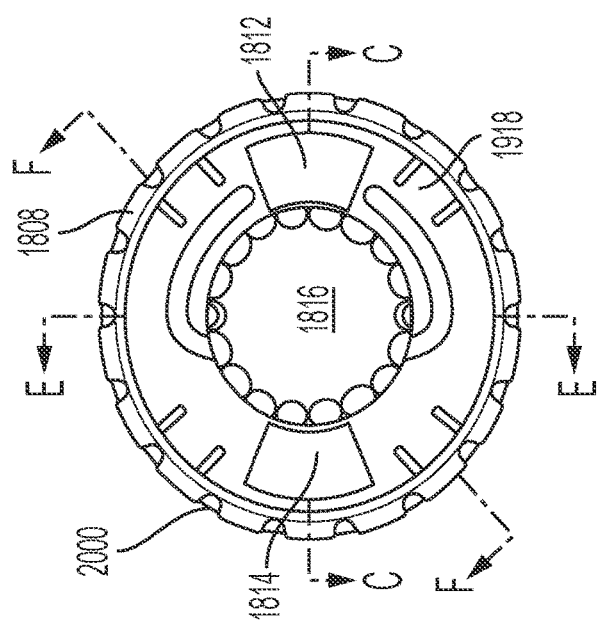
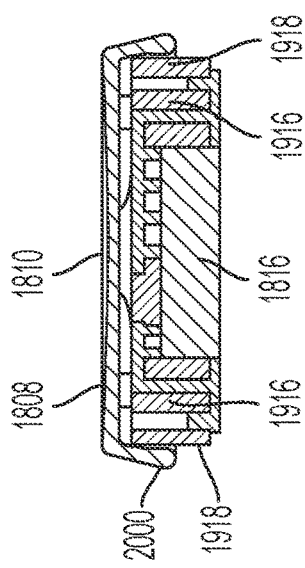
FIG. 18D
FIG. 18F
FIG. 18C
FIG. 18B
FIG. 18E

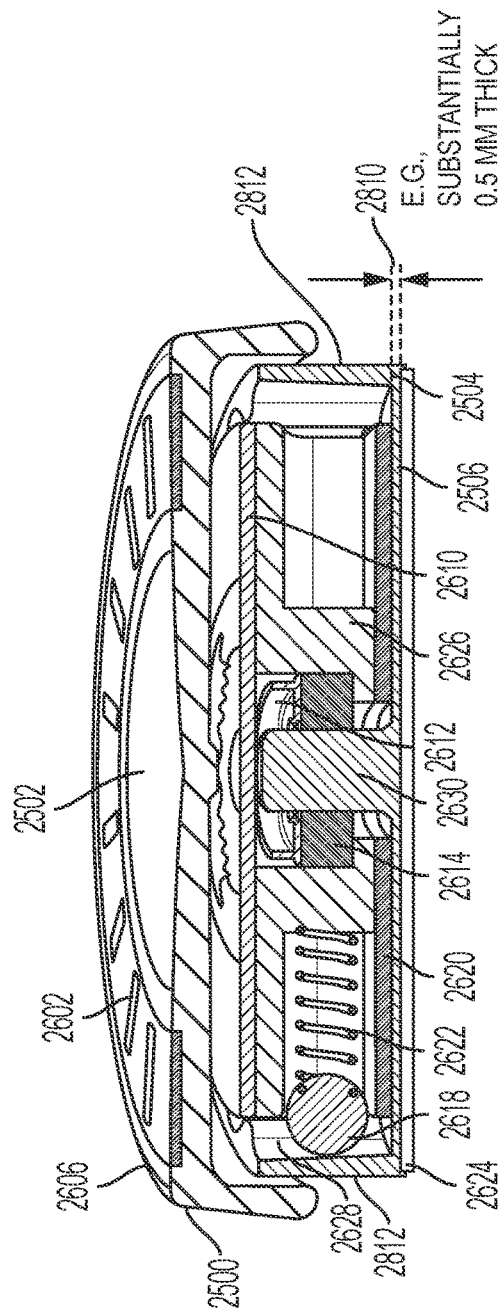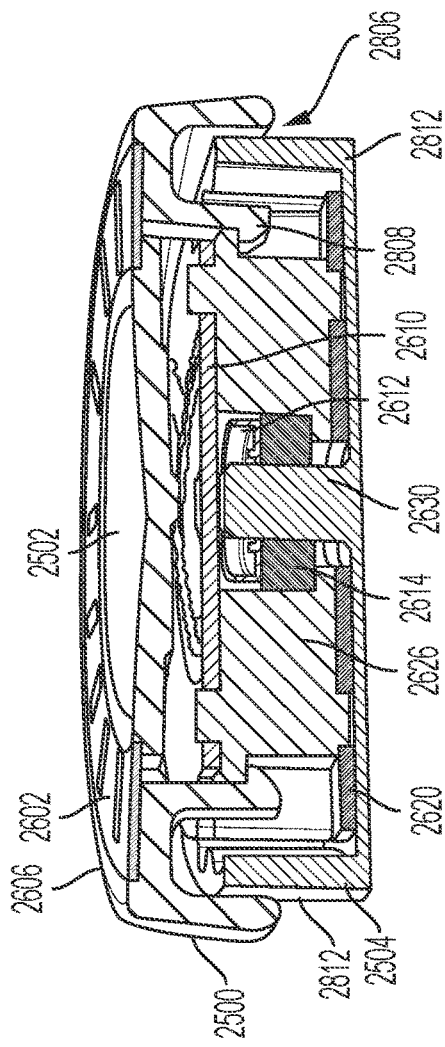

KNOB ON DISPLAY

CROSS-REFERENCE TO RELATED APPLICATIONS

This application is a continuation of U.S. patent application Ser. No. 16/947,326, filed Jul. 28, 2020, and titled "KNOB ON DISPLAY DEVICES AND RELATED SYSTEMS, METHODS, AND DEVICES," now U.S. Pat. No. 11,579,665, issued Feb. 14, 2023, which application claims the benefit of the filing date of: U.S. Provisional Patent Application No. 62/887,657, filed Aug. 15, 2019, and titled "KNOB ON DISPLAY WITH PUSH USING A TACTILE DOME SWITCH AND RELATED SYSTEMS, METHODS, AND DEVICES;" and U.S. Provisional Patent Application No. 62/901,383, filed Sep. 17, 2019, titled "KNOB ON DISPLAY WITH INTERNAL ELECTRODES;" the disclosure of each of which is hereby incorporated herein in its entirety by this reference.

FIELD

The present disclosure relates generally to knob on display devices for touch screen devices, and more specifically to knob on display devices including base assemblies.

BACKGROUND

Knobs on Display (KoDs, also referred to herein interchangeably as "KoD devices") are physical knobs that attach to a touch screen device. For example, sometimes these KoDs are glued to the touch screen device. KoDs are configured to interact with a touch sensor of the touch screen device. The touch screen device may provide various different graphical user interfaces that a KoD may be used to interact with via the touch sensor.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

FIGS. 9A-9C are a set of views of a portion of a two-PCB KoD, according to some embodiments;

FIG. 10 is a cross-sectional view of a two-PCB KoD including the portion of FIGS. 9A-9C, according to some embodiments;

FIG. 11A is a cross-sectional view of another two-PCB KoD including the portion of FIGS. 9A-9C, according to some embodiments;

FIGS. 15A-15C are views of an example of the overmold structure of the KoD of FIGS. 14A and 14B;

FIG. 16 is a side perspective view of an overmold of the overmold structure of FIGS. 15A-15C;

FIG. 17 is a top perspective view of a substrate of the overmold structure of FIGS. 15A-15C;

FIGS. 18A-18F are views of the KoD of FIGS. 14A-14B;

FIGS. 21A-21J are views of a KoD device, which is an example of the KoD device of FIG. 20;

DETAILED DESCRIPTION

Figure 1:
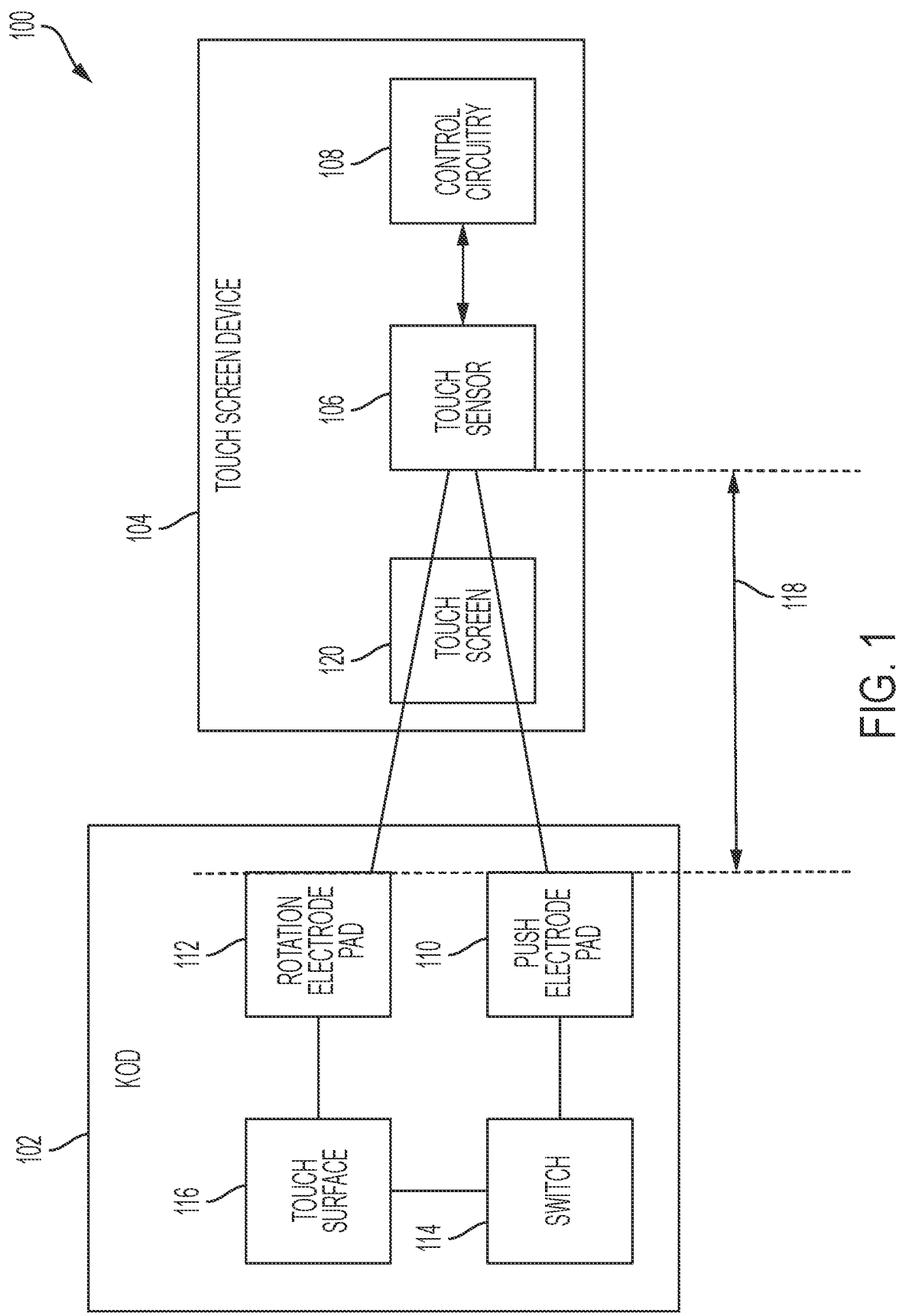
FIG. 1 is a block diagram of a first embodiment of a Knob on Display (KoD) system according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met. As understood for purposes of the embodiments described in this disclosure, a capacitive sensor may respond to an object's (such as a finger or a stylus) contact with, or the object's proximity to, a contact-sensitive area of the capacitive sensor. In this disclosure "contact" and "touch" are meant to encompass both an object's physical contact with a contact-sensitive area (e.g., an electrode or one or more overlays covering an electrode or group of electrodes, without limitation) and an object's presence within proximity of a contact-sensitive area without physical contact. Actual physical contact with a capacitive sensor is not necessarily required.

By way of an example, when an object contacts a capacitive sensor, a change in capacitance may occur within the capacitive sensor at or near the location of the contact. An analog acquisition front-end may detect the contact if it meets a certain threshold. "Charge-then-transfer" is a non-limiting example of a technique implemented in some touch-acquisition front-ends for detecting capacitive changes, whereby a sensing capacitor is charged responsive to a change in capacitance (e.g., charged faster or slower) and a charge is transferred to an integrating capacitor over multiple charge-transfer cycles. An amount of charge associated with such a charge-transfer may be converted to digital signals by an analog-to-digital converter (ADC), and a digital controller may process those digital signals (typically referred to as "delta counts" or just "deltas") to determine measurements and/or detect if an object contacted a sensor.

Self-capacitance sensors (also referred to herein as "self-cap sensors") are capacitive field sensors that respond to changes in capacitance to ground. They are typically laid out in an array of rows and columns that react independently to a touch. By way of non-limiting example, a self-cap sensor may include a circuit employing repetitive charge-then-transfer cycles using common integrated CMOS push-pull driver circuitry having floating terminals.

Mutual capacitance sensors are capacitive field sensors that detect/respond to changes in capacitance between two electrodes: a drive electrode and a sense electrode. The drive electrode and sense electrode pairs at each intersection of drive and sense lines form a capacitor. Self-capacitance and mutual capacitance techniques may be used in the same touch interface system, and may be complimentary to each other, for example, self-capacitance may be used to confirm a touch detected using mutual capacitance.

As an example, touch sensors may be overlaid in a two-dimensional (2-D) arrangement (i.e., a 2-D touch sensor) for a 2-D contact sensitive surface, for example, of a touch pad or a display screen, and may facilitate user interaction with an associated device or appliance. Insulating protective layers (e.g., resins, glass, and/or plastic, without limitation) may be used to cover touch sensors and may be referred to herein as an "overlay" or "touch screen." As used herein, a "touch screen device" is a display (such as a liquid crystal display (LCD), thin-film-transistor (TFT) LCD, or a light emitting diode (LED) display) that incorporates 2-D touch sensors (e.g., implemented in a transparent medium over the display, sometimes with an overlay or touch screen including an additional transparent medium such as glass in front of the touch sensors).

Using the example of a touch screen sensor that uses a matrix sensor approach of mutual capacitance sensors employing charge-transfer techniques, drive electrodes may extend in rows on one side of a substrate and sense electrodes may extend in columns on a second side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately measured or both measured in response to a capacitive change indicative of a touch event. For example, if a drive signal is applied to the drive electrode of row 2 and a sense electrode of column 3 is active then the node position is: row 2, column 3. Nodes may be scanned by sequencing through different combinations of drive and sense electrodes. In one mode the drive electrodes may be driven sequentially while the sense electrodes are all continuously monitored. In another mode each sense electrode may be sampled sequentially.

Using the example of a touch screen that uses a matrix sensor approach of self-capacitance sensors, electrodes may extend in rows and columns to define a "matrix" array of N by M nodes. The matrix sensor may be constructed with an intersection of electrodes at each node, each electrode being individually addressable, or each row and column may be an addressable electrode and each node corresponds to a unique row/column pair. A drive signal (i.e., an A/C stimulus) is repeatedly provided to the electrodes of the sensor. When an object contacts the sensor, coupling between the object and the electrodes increases the current drawn on the electrodes which increases the apparent sensor capacitance, and this increase in sensor capacitance may be detected. For example, if an increase in capacitance is detected while a drive signal is applied to electrode row 2 and electrode column 3, then the location of a touch may be row 2, column 3. Interpolation techniques may be used to identify locations between nodes. Nodes may be scanned sequentially by sequencing through combinations of rows and columns of electrodes.

Drive signals (i.e., the AC stimulus) described above are one cause of electromagnetic emissions (EME). Capacitance is typically measured synchronously with the drive signals. So, there is a direct relationship between the sampling rate of a measurement and frequency of emission of EME.

Knob on Display (KoD) devices disclosed herein have one or more conductive pads on a side of the KoD device that faces the touch sensor. These conductive pads are detected by control circuitry (e.g., a microcontroller) through the touch sensor panel to report positions, angles, and/or button presses of the KoD. As compared to prior KoD devices, KoDs disclosed herein may have one or more of the following advantages:

reduced mechanical components, simplifying the design
 reduced Z push travel distance (where Z is the direction towards the touch screen device)
 increased reliability of the electrical connection
 a total Z height of the KoD less than ten millimeters (10 mm) for automotive safety regulations.

KoD devices disclosed herein may provide one or more of the following advantages:

act as tactile feedback giving users a "click" feeling when pushing the KoD
 provide a spring return for a push (dome material (e.g., metal) of a dome switch deflects and returns to its natural formed released state)
 provide an electrical connection path from a touch surface of a KoD (e.g., a surface on top of the KoD) to a rotation electrode pad
 provide an electrical connection path from the touch surface of the KoD to a push electrode pad once the dome is depressed e.g., via a user pushing on the touch surface of the KoD
 create a stable touch surface of the KoD that gives an even push feel as a finger moves over the surface thereof
 provide relatively good electrical connection to electrode pads
 simplify mechanical construction as compared to KoDs having electrode pads that travel toward the touch screen as the KoD is depressed
 produce a KoD sensor that incorporates design principles of a traditional fully mechanical solution (i.e., not on a touch sensor)
 detect rotation of an electrode pad
 detect push of the tactile dome.

Electrode pads of the KoD of the present embodiments are effectively always physically in engagement proximity to the touch sensor of the touch screen device. For example, the electrode pads of the KoD may be maintained at constant distances from the touch screen and the touch sensor of the touch screen device regardless of a depressed position or a released position of the KoD. The rotation electrode pad is always electrically connected to a touch surface of the KoD while the push electrode pad is electrically disconnected from the touch surface of the KoD in an electrically floating state when the KoD switch is released, i.e., not depressed then electrically connected to the touch surface of the KoD when the KoD switch is depressed. As a result, in contrast to relying on a push electrode pad that itself physically moves toward a touch sensor surface as a user pushes on the touch surface of the KoD, the push electrode pad of the present embodiments remains in engagement proximity to the touch sensor, but is selectively electrically connected to the touch surface of the KoD responsive to depression of the KoD. The push electrode pad and the rotation electrode pad may remain at constant distances from the touch screen and the touch sensor of the touch screen device as the KoD transitions between depressed and released positions. As a result, embodiments disclosed herein avoid problems associated with push electrode pads that physically move toward the touch sensor as the KoD switch is depressed. For example, one avoided problem of the prior art is that a large Z direction travel distance (e.g., one to two millimeters, which is much greater than that required of typical tactile dome switches) of the KoD switch is used in moving push electrode pads to ensure that the push electrode does not come into detect threshold distance of the touch sensor while not depressed. Another avoided problem of the prior art is difficulty in mechanical tolerancing of components of KoDs having push pads that move into and out of engagement proximity of touch sensor surfaces of touch screen devices.

In some embodiments, a printed circuit board (PCB) or a flexible printed circuit (FPC) may be used as a base of a KoD directly on a touch screen. The PCB/FPC may have rotation and push electrode pads connected to a tactile dome switch. The rotation electrode pad is connected to outer legs of a dome and a center of the dome is connected (e.g., selectively based on a depressed or non-depressed state of the KoD) to the push electrode pad. Accordingly, a separate physical rotation electrode pad with a spring connection back to the KoD touch surface need not be used. Also, Z direction (direction toward the touch screen device) travel distance in such embodiments may be less than one millimeter (e.g., 0.3 millimeter to 0.5 millimeter), which is typical of a tactile dome switch.

In some embodiments, a KoD includes a folded FPC to enable a portion of the FPC to lay flat proximate to the touch screen without other portions of the FPC behaving as extra electrodes on the touch screen. Also, the folded FPC may include a hole to receive a central hub, which may be adhered to the touch screen with an adhesive. The KoD may rotate around the central hub to enable rotation of a rotation electrode pad about the central hub.

In some embodiments, twin shot injection molding is used to manufacture conductive plastic used for electrode pad parts. In some embodiments, insert molding is used to insert metal electrodes into a mold tool prior to plastic injection. In some embodiments, two-material three-dimensional (3D) printing may be used where one filament includes a conductive material. In some embodiments, laser direct structuring may be used to create a molded interconnect device.

Embodiments disclosed herein may be used in the automotive and consumer product markets. By way of non-limiting examples, KoDs disclosed herein may be used in automobile center stacks and consumer appliances. It will be understood, however, that embodiments disclosed herein may be used in any environment where KoDs on touch screen devices may be useful or helpful.

Also disclosed herein are KoD devices having robust electrode designs that have reduced susceptibility to foreign elements such as water and dirt ingress and improved adhesion area for attachment to touch screens of touch screen devices. One or more conductive pads on the rear of the KoD device are detected by control circuitry of a touch screen device (e.g., via a touch sensor of the touch screen device) to report positions/angles of the one or more conductive pads.

Some KoD devices disclosed herein are electromechanical solutions that provide at least some protection from foreign elements (e.g., water, dust, dirt). In some embodiments, a base assembly for a KoD device at least partially encases electrodes of the KoD device. This base assembly may be directly attached to the touch screen using a full surface area of the base assembly, therefore maximizing adhesion (in contrast to the use of only a portion of the surface area of the base assembly being adhered to the touch screen). Any foreign elements such as water and dirt are prevented from entering the electrode area because an edge lip or side walls of the base assembly may reduce influx of water and dirt. In some embodiments, a fully sealed KoD device may be created using a seal (e.g., a rubber seal) between a base assembly and an upper rotating component.

In contrast to placement of one or more electrode pads in contact with a touch screen surface of the touch screen device, the KoD devices disclosed herein avoid allowing (i.e., inhibit, but do not necessarily always prevent) foreign elements such as dust and liquid from working their way under electrodes, degrading both electrical and mechanical performance. Also, embodiments disclosed herein allow adhesive to be applied to the entire bottom side of the base assembly, in contrast to KoD devices that have an adhesive area amounting to only an inner center area to attach the KoD to the touch sensor. As a result, in contrast to other KoD devices known to the inventors of this disclosure, the KoD devices disclosed herein do not allow (i.e., inhibit, but do not necessarily always prevent) foreign elements to enter between a touch screen and electrodes of a KoD device. As a result, embodiments disclosed herein amount to robust solutions that inhibit liquid and dirt ingress, are at least partially sealed, and increase adhesion surface area to enable a KoD device to bond well to a touch screen device.

Embodiments disclosed herein provide for improved performance and water immunity as compared to devices known to the inventors of this disclosure. Also, dirt or liquid ingress may be avoided as dirt and liquid are prevented from entering underneath KoD devices disclosed herein due to adhesive fully covering an underside of the base assembly. This improved adhesive surface area may enhance one or more of the strength, durability, and stability of the connections between a KoD device and a touch screen device.

FIG. 1 is a block diagram of a KoD system 100, according to some embodiments. The KoD system 100 includes a KoD 102 and a touch screen device 104. The touch screen device 104 includes control circuitry 108 operably coupled to a touch sensor 106 and a touch screen 120 over the touch sensor 106. The KoD 102 includes a touch surface 116, a switch 114, a rotation electrode pad 112, and a push electrode pad 110. The touch surface 116 is electrically connected to the rotation electrode pad 112, and selectively electrically connected to the push electrode pad 110 through the switch 114. The KoD 102 is configured to be mounted to the touch screen device 104 with the rotation electrode pad 112 and the push electrode pad 110 in engagement proximity 118 to the touch sensor 106.

As used herein the term "engagement proximity" refers to a proximity to a touch screen (e.g., touch screen 120) within which a touch sensor (e.g., touch sensor 106) of a touch screen device (e.g., touch screen device 104) may measurably respond to contact on a touch surface (e.g., touch surface 116) while a push electrode pad (e.g., push electrode pad 110) or a rotation electrode pad (e.g., rotation electrode pad 112) is electrically connected to a touch surface (e.g., touch surface 116). In some instances, an electrode pad may be referred to as being in engagement proximity to a touch screen of a touch screen device, and in other instances an electrode pad may be referred to as being in engagement proximity to a touch sensor of a touch screen device, both of which interchangeably refer to the definition of "engagement proximity" provided above.

In some embodiments, the KoD 102 includes a touch surface 116 including a conductive material (not shown), the touch surface 116 configured such that the touch surface is operable to be positioned in a released position by default and in a depressed position responsive to pressure applied to the touch surface 116 (the pressure triggering the switch 114). The KoD 102 also includes a push electrode pad 110 configured to be positioned in engagement proximity to a touch sensor 106 of a touch screen device 104 in both the released position and the depressed position. The push electrode pad 110 is maintained at a constant distance from the touch screen 120 regardless of the released position or the depressed position of the KoD 102. The push electrode pad 110 is electrically connected to the conductive material of the touch surface 116 responsive to the depressed position of the touch surface 116 and electrically isolated from the conductive material of the touch surface 116 responsive to the released position of the touch surface 116. In some embodiments, the KoD 102 further includes a rotation electrode pad 112 configured to be positioned in engagement proximity to the touch sensor 106 of the touch screen device 104 in both the released position and the depressed position of the touch surface 116. The rotation electrode pad 112 is electrically connected to the conductive material of the touch surface 116 in both the released position and the depressed position of the touch surface 116. Accordingly, the control circuitry 108 of the touch screen device 104 may be programmed (e.g., using firmware or software) to detect the user touching the touch surface 116 (e.g., a "grab detect").

In some embodiments, the KoD 102 further includes an FPC configured to electrically connect the push electrode pad 110 and the rotation electrode pad 112 to the touch surface 116. In some embodiments, the KoD 102 includes a PCB configured to electrically connect the push electrode pad 110 and the rotation electrode pad 112 to the touch surface 116. In some embodiments, the KoD 102 includes a folded FPC configured to electrically connect the push electrode pad 110 and the rotation electrode pad 112 to the touch surface 116. In some embodiments, the KoD 102 includes a conductive overmold including the push electrode pad 110 and the rotation electrode pad 112.

In some embodiments, a distance between the released position of the touch surface 116 and the depressed position of the touch surface 116 is less than 1 millimeter, preferably between three tenths of a millimeter (0.3 mm) and one-half of a millimeter (0.5 mm). In some embodiments, a distance between the released position of the touch surface 116 and the depressed position of the touch surface 116 is about six tenths of a millimeter (0.6 mm). In some embodiments, the push electrode pad 110 is configured to remain in an electrically floating state (e.g., not electrically connected to the touch surface 116) responsive to the touch surface 116 being in the released position. KoD 102 further includes the switch 114 configured to selectively operably couple the push electrode pad 110 to the conductive material of the touch surface 116 responsive to the depressed position (e.g., the switch 114 may include the touch surface 116 thereon). The present embodiments are being described in some detail where the push electrode pad 110 is coupled to the conductive material of the touch surface 116 responsive to the depressed position, and not electrically connected to the touch surface 116 responsive to the touch surface 116 being in the released position being not it being understood that the reverse may be similarly accomplished. Thus, generally, the touch surface 116 is electrically connected to the push electrode pad 110 responsive to a first position of the KoD device 102 (e.g., depressed), the touch surface 116 electrically isolated from the push electrode pad 110 responsive to a second position of the KoD device 102 (e.g., released). In some embodiments, the switch 114 includes a dome switch. In some embodiments, the switch 114 includes multiple dome switches (e.g., for KoD devices that are sufficiently large to accommodate multiple KoDs).

Figure 2:
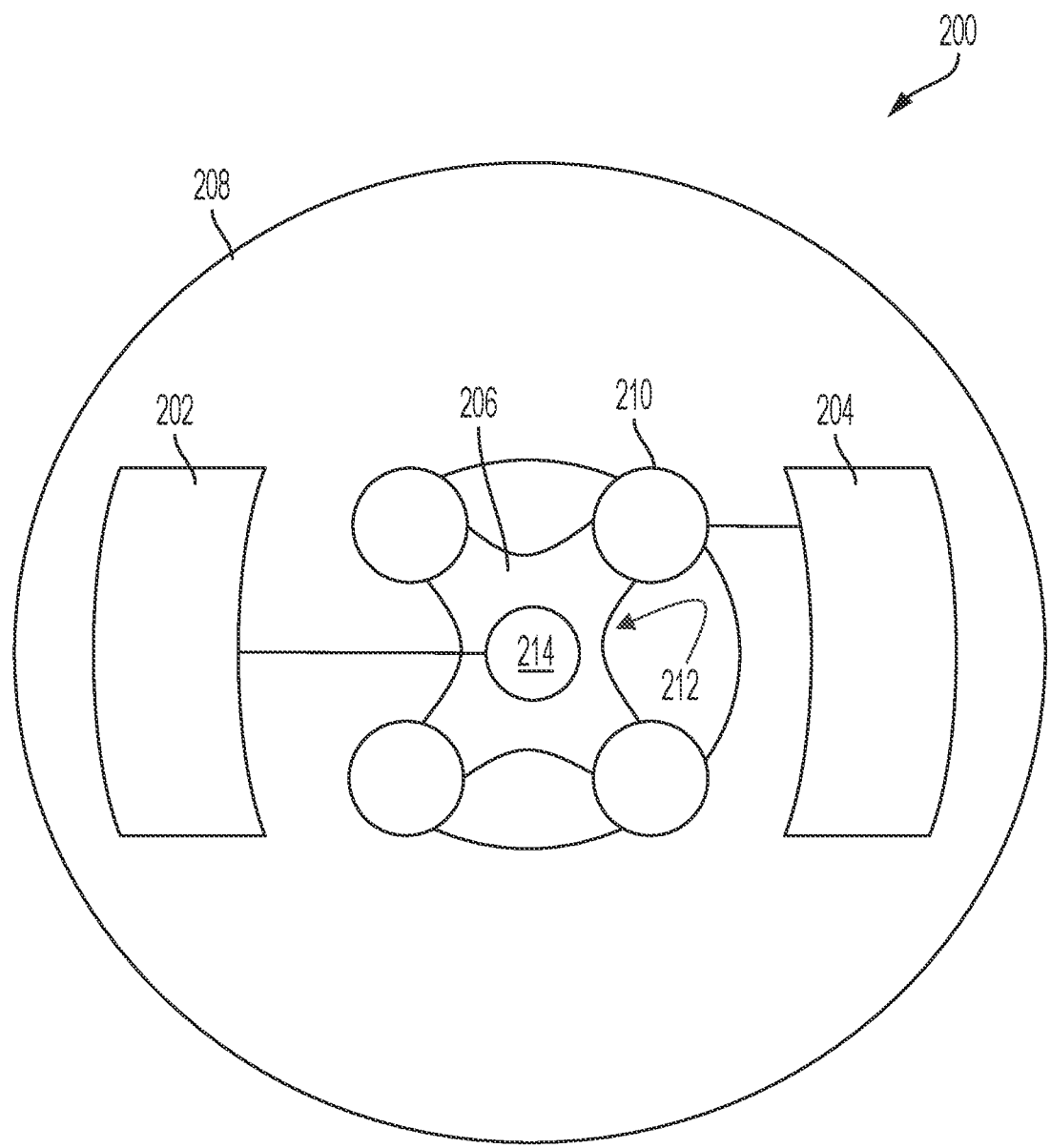
FIG. 2 is a bottom view of an example of a flat circuit for a KoD, according to some embodiments.

FIG. 2 is a bottom view of an example of a flat circuit 200 for a KoD, according to some embodiments. The flat circuit 200 includes a PCB 208 and a tactile dome switch 206 electrically connected to the PCB 208 via one or more dome switch pads 210. The PCB 208 includes a push electrode pad 202 and a rotation electrode pad 204. The rotation electrode pad 204 is electrically connected to the dome switch pads 210 such that the rotation electrode pad 204 is electrically connected to a touch surface 212 of the tactile dome switch 206 regardless of a position of the tactile dome switch 206. Accordingly, if a user's finger, stylus, or other touch instrument is in contact with the tactile dome switch 206, the rotation electrode pad 204 is electrically connected to the user's finger, stylus, or other touch instrument via the dome switch pads 210 and the touch surface 212.

The push electrode pad 202 is selectively electrically connected to the touch surface 212 of the tactile dome switch 206 responsive to a depressed position of the tactile dome switch 206 and electrically isolated from the touch surface 212 responsive to a released position of the tactile dome switch 206. As a result, when a user's finger, stylus, or other touch instrument is in contact with and depresses the tactile dome switch 206 into the depressed position, the push electrode pad 202 is electrically connected to the finger, stylus, or other touch instrument via the touch surface 212. On the other hand, when the tactile dome switch 206 is in the released position, the push electrode pad 202 is electrically isolated from the user's finger, stylus, or other touch instrument even if the user's finger, stylus, or other touch instrument is in contact with the touch surface 212. By way of non-limiting example, a trace electrically connected to the push electrode pad 202 may extend underneath the tactile dome switch 206 to a contact pad 214 under the tactile dome switch 206. With the KoD applied to a touch screen of a touch screen device, the tactile dome switch 206 is outside of engagement proximity from the touch sensor of the touch screen device. When the tactile dome switch 206 is depressed, the tactile dome switch 206 may contact the contact pad under the tactile dome switch 206, which electrically connects the tactile dome switch 206 to the push electrode pad 202.

Figure 3A:
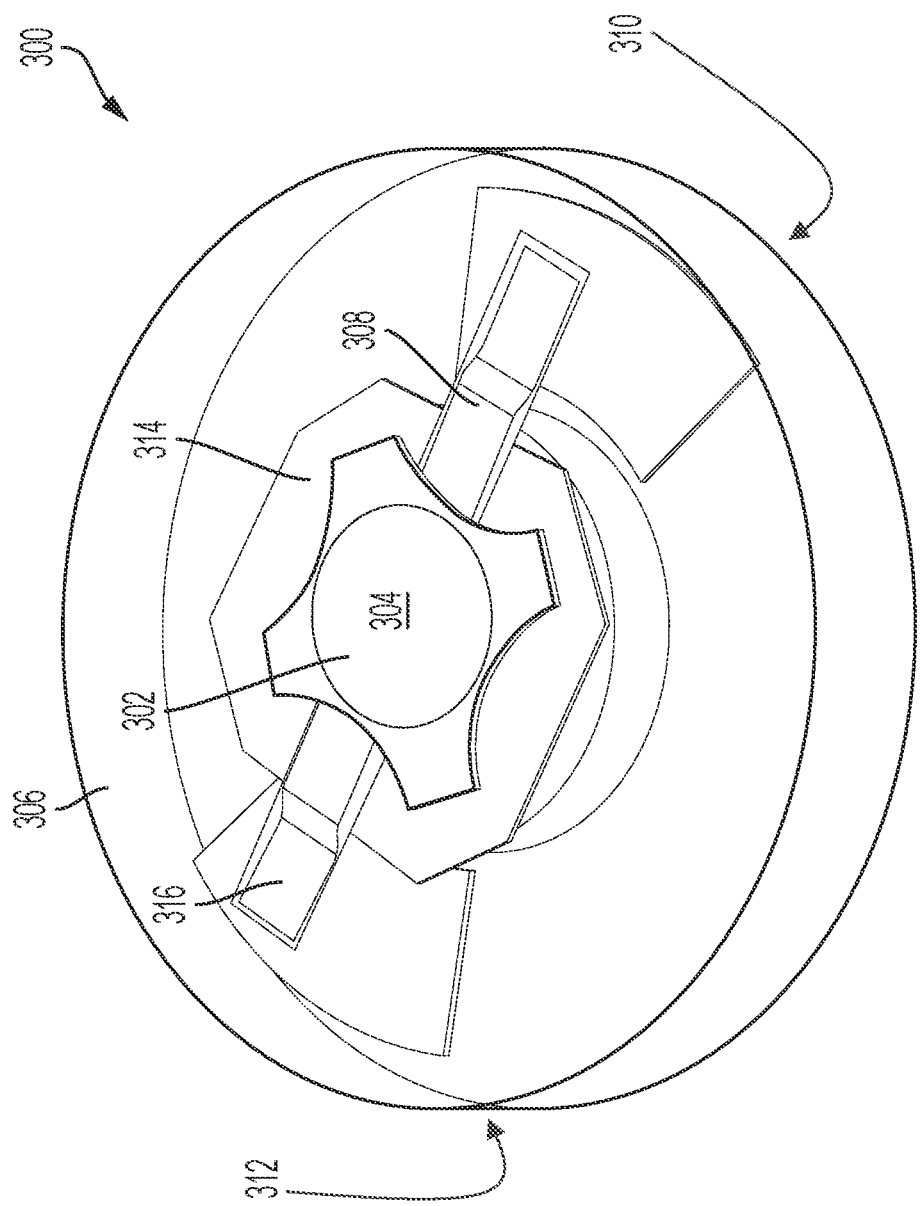
FIG. 3A is a top perspective view of a KoD, according to some embodiments.
Figure 3B:
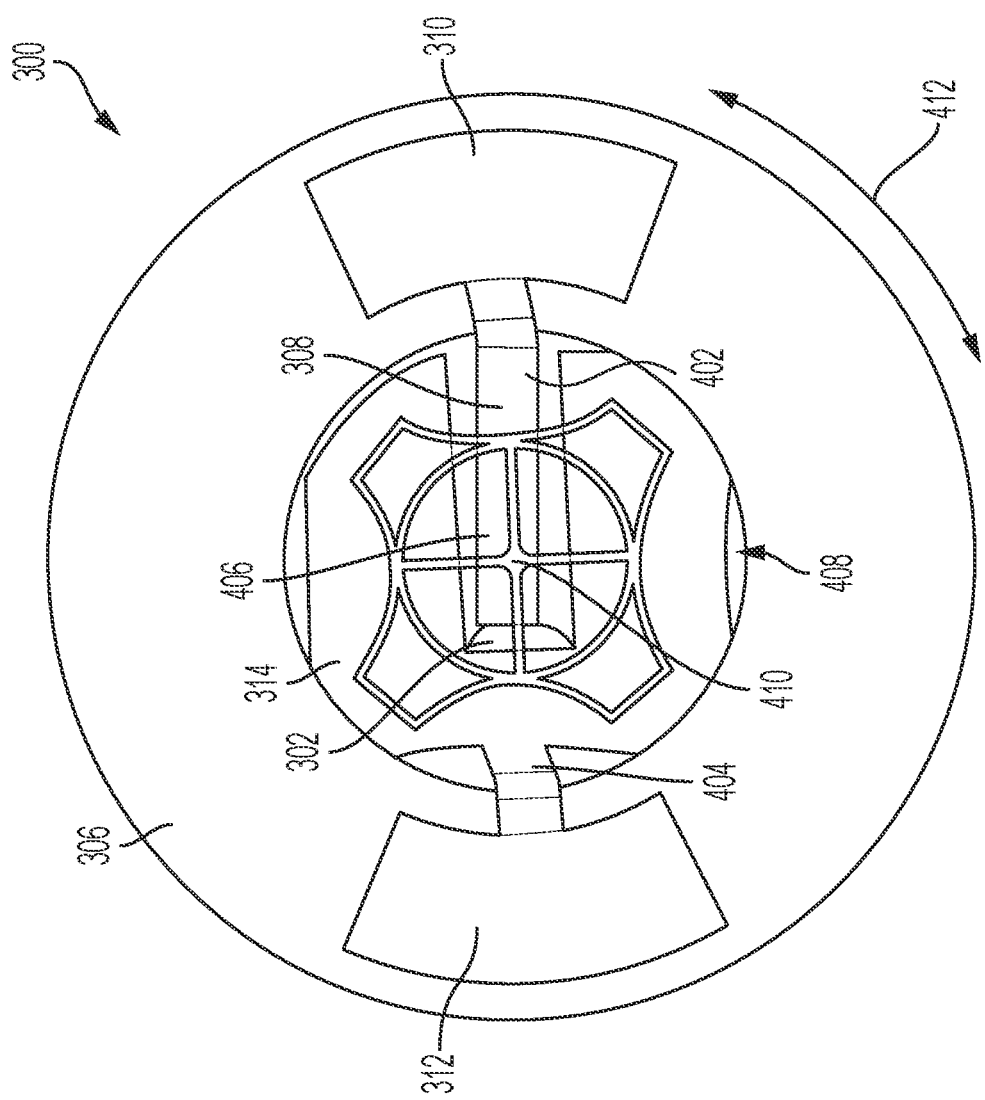
FIG. 3B is a bottom view of the KoD of FIG. 3A.
Figure 3C:
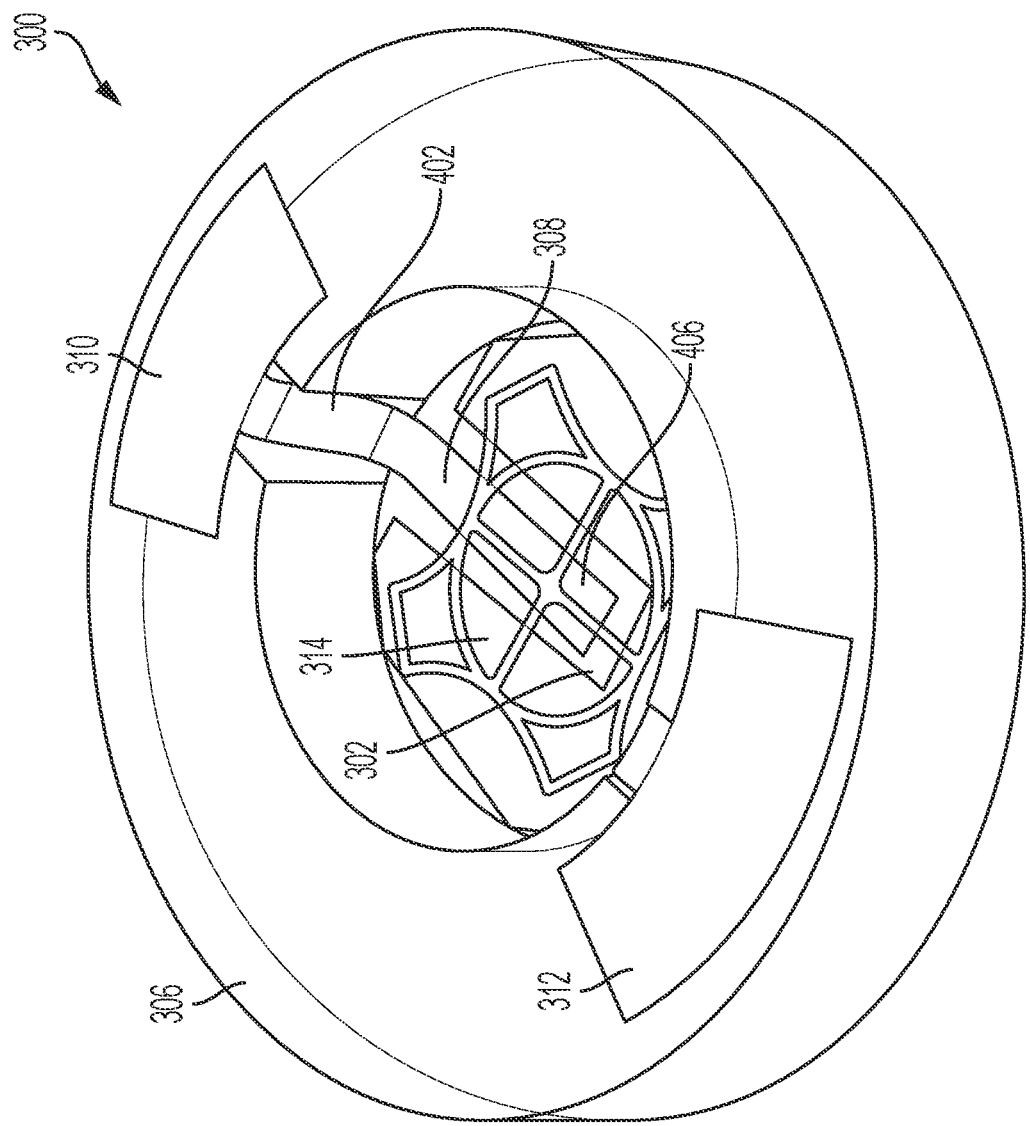
FIG. 3C is a bottom perspective view of the KoD of FIG. 3A and FIG. 3B.

FIG. 3A through FIG. 3C are various views of a KoD 300, according to some embodiments. FIG. 3A is a top perspective view of the KoD 300. FIG. 3B is a bottom view of the KoD 300 of FIG. 3A. FIG. 3C is a bottom perspective view of the KoD 300 of FIG. 3A and FIG. 3B.

The KoD 300 includes a body 306 carrying conductive (e.g., metal) structures including a push electrode pad 310, a rotation electrode pad 312, a dome switch pad 314, a push contact trace 308, a rotation trace 316, conductive structure 402, and conductive structure 404. The body 306 may include a rigid electrically insulating material (e.g., acrylic). The push electrode pad 310 and the rotation electrode pad 312 may be positioned on a bottom side of the KoD 300, which may be configured to be rotatably secured proximate to a touch screen (e.g., directly on the touch screen, in engagement proximity to a touch sensor of the touch screen).

The dome switch pad 314 and the push contact trace 308 may be positioned on a top side of the KoD 300. The KoD 300 also includes a dome switch 302 operably coupled to the dome switch pad 314. The dome switch pad 314 is electrically connected to the rotation electrode pad 312 through a rotation trace 316 on the top of the body 306. By way of non-limiting example, the conductive structure 404 may connect the rotation trace 316 on the top of the body 306 to the rotation electrode pad 312 on the bottom side of the body 306. The push contact trace 308 may extend underneath the dome switch 302 to a push contact 406. The push contact 406 is configured to electrically connect to the dome switch 302 responsive to the dome switch 302 being in a depressed position and be electrically isolated from the dome switch 302 responsive to the dome switch 302 being in a released position. The push contact trace 308 is electrically connected to the push electrode pad 310 by the conductive structure 402.

The KoD 300 includes a dome switch 302 and a touch surface 304 on the dome switch 302. The touch surface 304 includes electrically conductive material to electrically connect the touch surface 304 to a finger or stylus of a user interacting with the KoD 300. In both a released position and a depressed position of the dome switch 302 a touch to the touch surface 304 may be electrically coupled to the rotation electrode pad 312 via the dome switch 302, the dome switch pad 314, the rotation trace 316, and the conductive structure 404. In the released position of the dome switch 302 a touch to the touch surface 304 may be electrically isolated from the push electrode pad 310. In the depressed position of the dome switch 302 a touch to the touch surface 304 may be electrically connected to the push electrode pad 310 via the dome switch 302, the push contact 406, push contact trace 308, and the conductive structure 402.

The KoD 300 further includes a recess 408 configured to receive a central hub (not shown). The central hub may be secured (e.g., adhered) to a touch screen and the KoD 300 may rotate around the central hub. Accordingly, in operation the KoD 300 may rotate 412 around a central axis 410 of the KoD 300, and positions of the push electrode pad 310 and the rotation electrode pad 312 may rotate 412 around the central axis 410.

Figure 4:
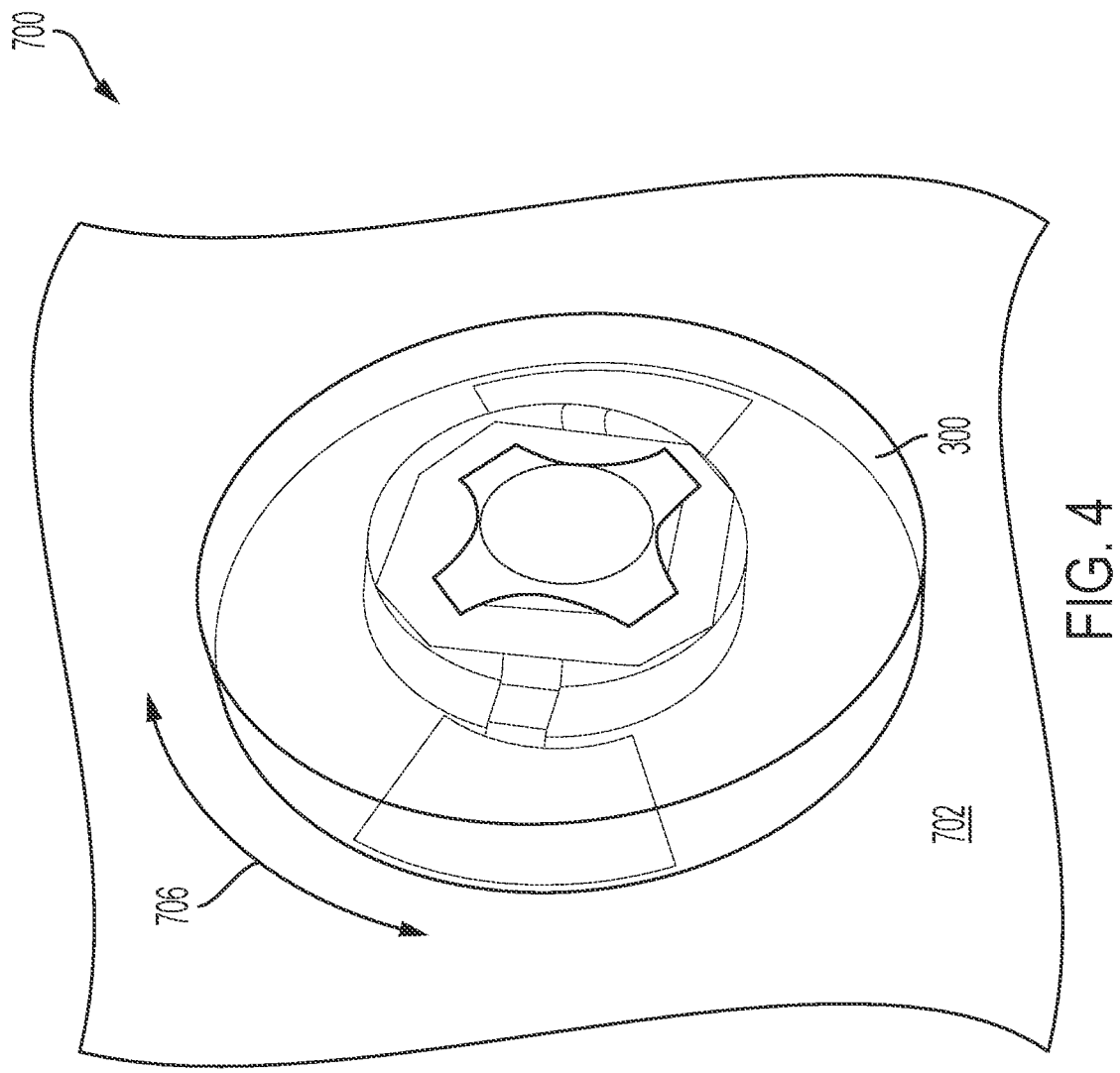
FIG. 4 is a perspective view of the KoD of FIG. 3A, FIG. 3B, and FIG. 3C in a KoD system, according to some embodiments.

FIG. 4 is a perspective view of the KoD 300 of FIG. 3A, FIG. 3B, and FIG. 3C in a KoD system 700, according to some embodiments. The KoD system 700 includes a touch screen device (e.g., the touch screen device 806 of FIG. 5) including a touch screen 702. The KoD 300 is secured on the touch screen 702 (e.g., stuck to the touch screen 702 using, for example, an adhesive). With the KoD 300 positioned on the touch screen 702, the rotation electrode pad 312 and the push electrode pad 202 (FIG. 3A) of the KoD 300 are constantly in engagement proximity with the touch screen 702 (e.g., with a touch sensor of the touch screen 702). The rotation electrode pad 312 is permanently connected to the dome and the push electrode pad 202 is by default in an electrically floating state (e.g., electrically disconnected from the touch surface 304 (FIG. 3A)). Rotation 706 of the KoD 300 results in rotation of the rotation electrode pad 312 with the KoD 300. Pushing of the dome switch 302 (FIG. 3A) electrically connects the push electrode pad 202 to the touch surface 304, as previously discussed.

Figure 5:
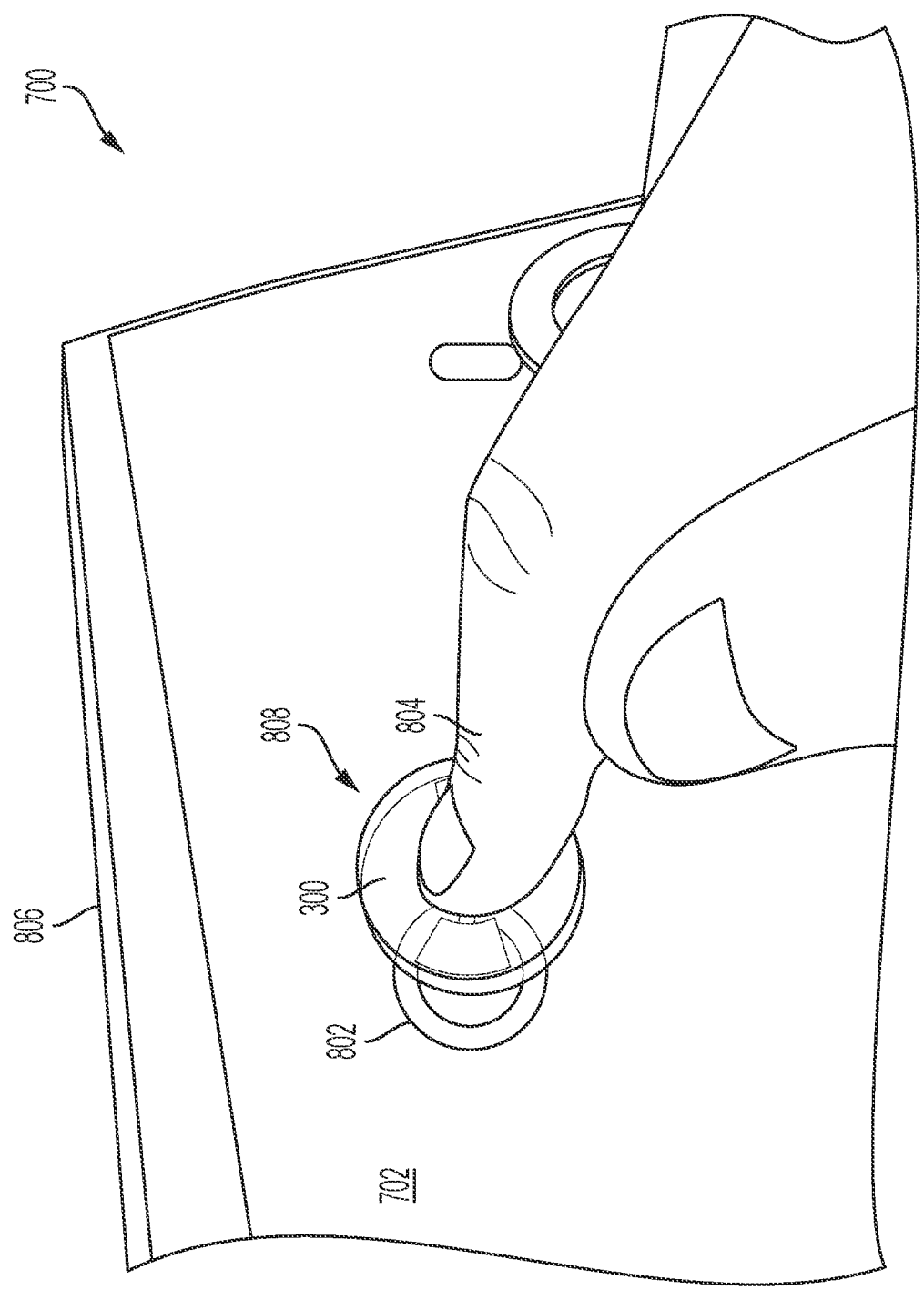
FIG. 5 is a perspective view of a KoD system including the KoD of FIG. 3A, FIG. 3B, FIG. 3C, and FIG. 4 with the KoD in a released position.

FIG. 5 is a perspective view of the KoD system 700 with the KoD 300 in a released position 808. FIG. 5 illustrates a touch screen device 806, the touch screen 702 of the touch screen device 806, the KoD 300, and a finger 804 of a user touching the touch surface 304 (FIG. 3A) without pressing the dome switch 302 (FIG. 3A) into a depressed position. In other words, the KoD is in a released position 808. As a result, the rotation electrode pad 312 (FIG. 3B) is electrically connected to the touch surface 304, and in turn, the finger 804 of the user. Consequently, the touch screen 702 detects the touch proximate to the rotation electrode pad 312. A rotation ring 802 is shown displayed on the touch screen 702 proximate to the rotation electrode pad 312 to indicate the detected touch via the rotation electrode pad 312. The KoD 300 may be rotated, moving the location of the detected touch radially around a longitudinal central axis of the KoD 300 with rotation of the rotation electrode pad 312.

Figure 6:
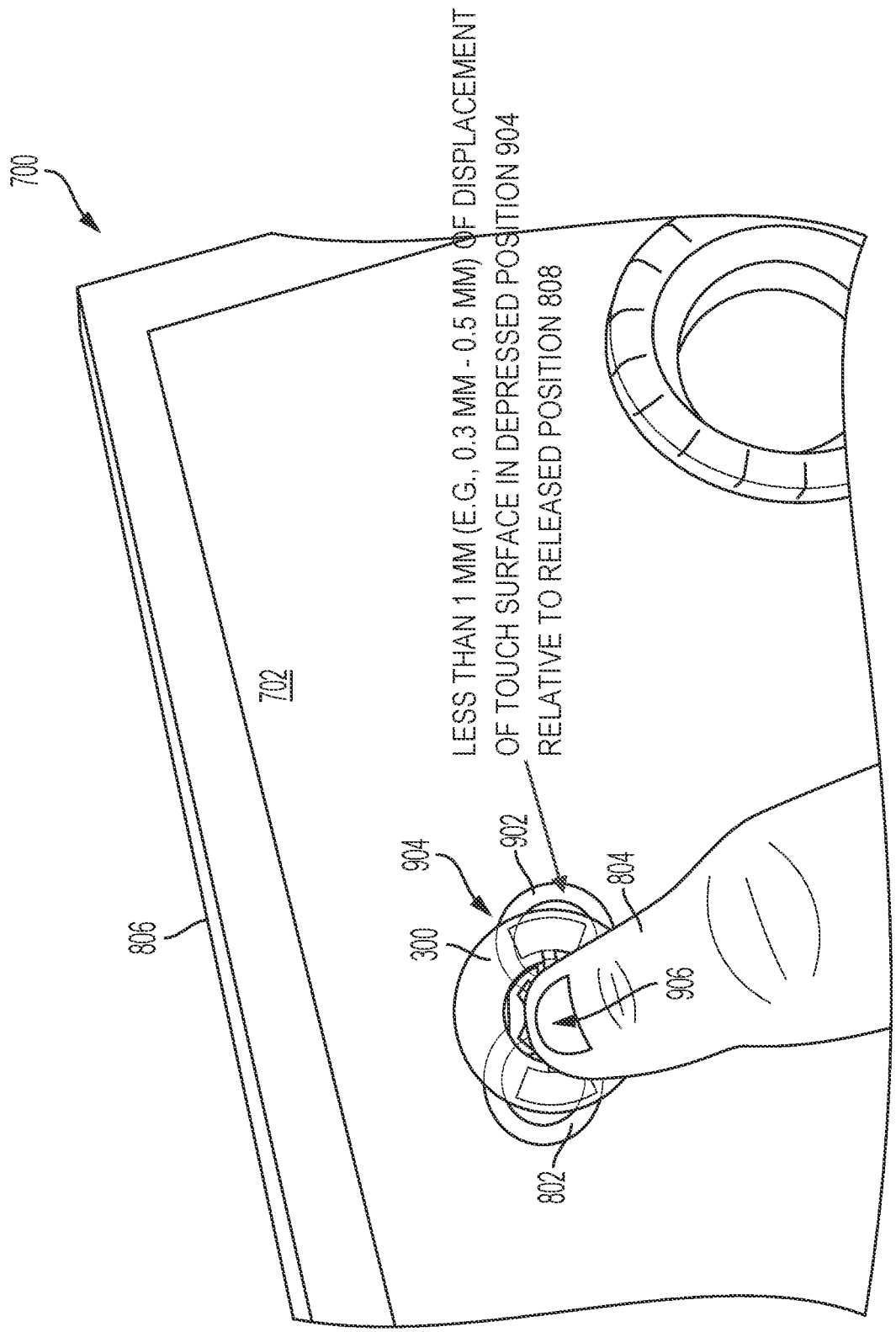
FIG. 6 is a perspective view of the KoD system of FIG. 4 and FIG. 5 with the KoD in a depressed position.

FIG. 6 is a perspective view of the KoD system 700 with the KoD 300 in a depressed position 904. FIG. 6 illustrates the finger 804 of a user applying pressure 906 to the dome switch 302 (FIG. 3A). As a result, the KoD 300 is in a depressed position 904. The push of the dome switch 302 electrically connects the touch surface 304 (FIG. 3A) to the push electrode pad 310 (FIGS. 3A, 3B, 3C), electrically connecting the finger 804 of the user to the push electrode pad 310. As a result, a touch sensor of the touch screen device 806 detects a touch proximate to the push electrode pad 310, which is illustrated by a push ring 902 displayed on the touch screen 702 to indicate detection of a touch detected responsive to the push electrode pad 310. The rotation ring 802 is also illustrated because the rotation electrode pad 312 (FIG. 3B) is always electrically connected to the touch surface 304, and so also electrically connected to the finger 804 of the user when in contact with the touch surface 304, causing a touch to be detected by the touch screen 702 proximate a location of the rotation electrode pad 312. In some embodiments, as illustrated in FIG. 6, the depressed position 904 may result in less than one millimeter (e.g., 0.3 millimeter to 0.5 millimeter, without limitation) of displacement of a touch surface relative to a location of the touch surface in the released position 808 (FIG. 5).

In some embodiments, the touch screen device 806 is configured to display multiple different graphical user interface elements proximate to the KoD 300 at different times to enable the user to interact with the different graphical user interface elements at different points in time via the KoD 300. By way of non-limiting example, the touch screen device 806 may be configured to display various different automobile graphical user interface elements at different times. As a specific non-limiting example, a first set of graphical user interface elements may include climate control user interface elements, a second set of graphical user interface elements may include stereo control user interface elements, and a third set of graphical user interface elements may include car seat and/or rear-view mirror control elements. The touch screen device 806 and the KoD 300 may operate together to enable the user to interface with these elements via rotations and presses of the KoD 300.

Figure 7:
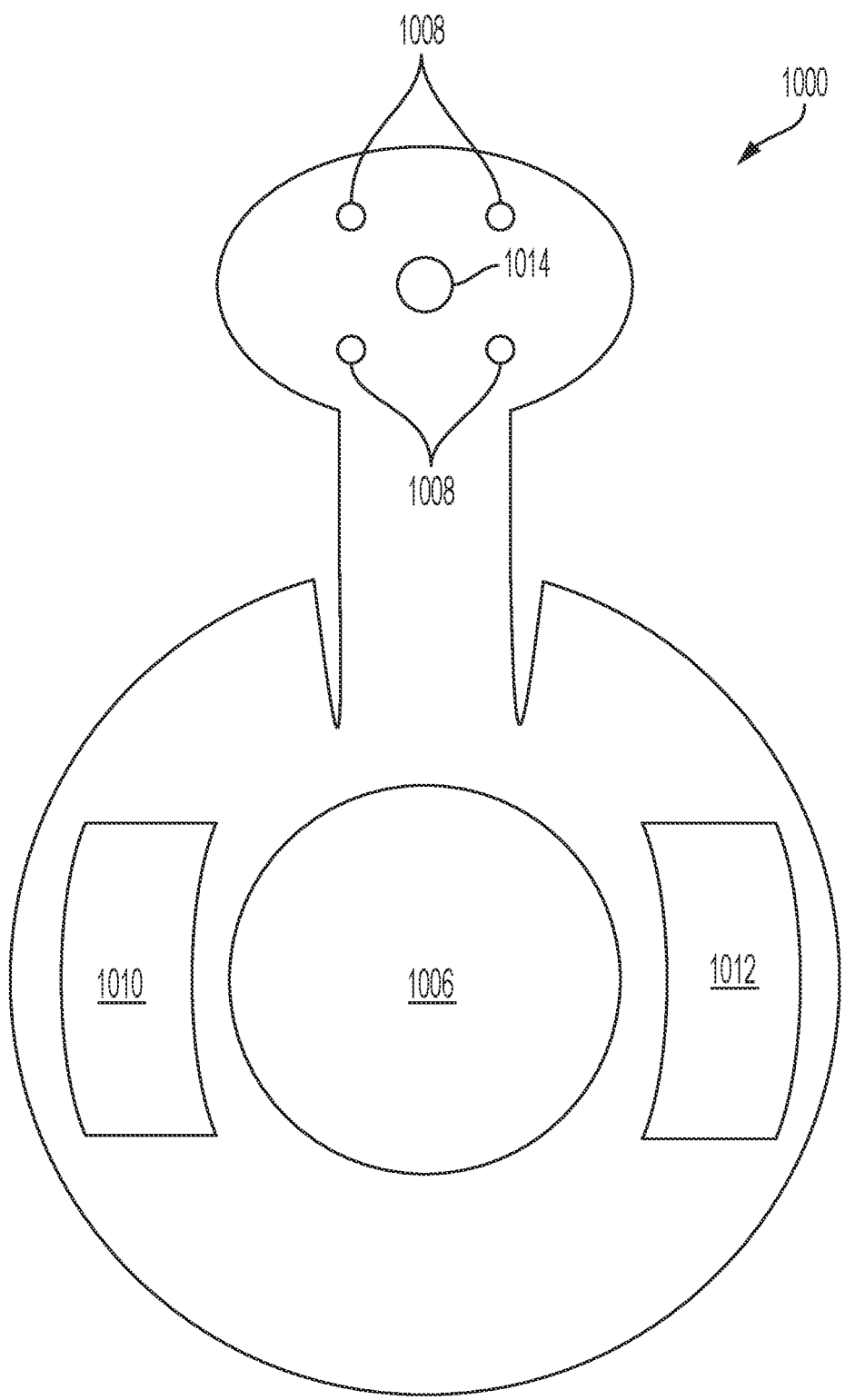
FIG. 7 is a bottom view of an example of a flat flexible printed circuit for a KoD, according to some embodiments.

FIG. 7 is a bottom view of an example of a flattened FPC 1000 for a KoD (e.g., a KoD 1100 of FIG. 8), according to some embodiments. The FPC 1000 has a center hole 1006, dome switch contacts 1008, and a depress contact 1014. The FPC 1000 also includes electrode pads including a push electrode pad 1010 and a rotation electrode pad 1012.

The rotation electrode pad 1012 may be electrically connected to the dome switch contacts 1008 (e.g., via one or more electrically conductive traces of the FPC 1000). Accordingly, when a user touches a dome switch coupled to the dome switch contacts 1008, the user's finger may be electrically connected to the rotation electrode pad 1012 regardless of a position of a switch (e.g., the switch 114 of FIG. 1) of the KoD (e.g., the KoD 1100 of FIG. 8).

The push electrode pad 1010 may be electrically connected to the depress contact 1014 (e.g., via one or more electrically conductive traces of the FPC 1000). Accordingly, when a user depresses a dome switch coupled to the dome switch contacts 1008, the user's finger may be electrically connected to the push electrode pad 1010 responsive to depression of the push switch (e.g., contacting the dome switch to the depress contact 1014 in a depressed position of the switch).

Figure 8:
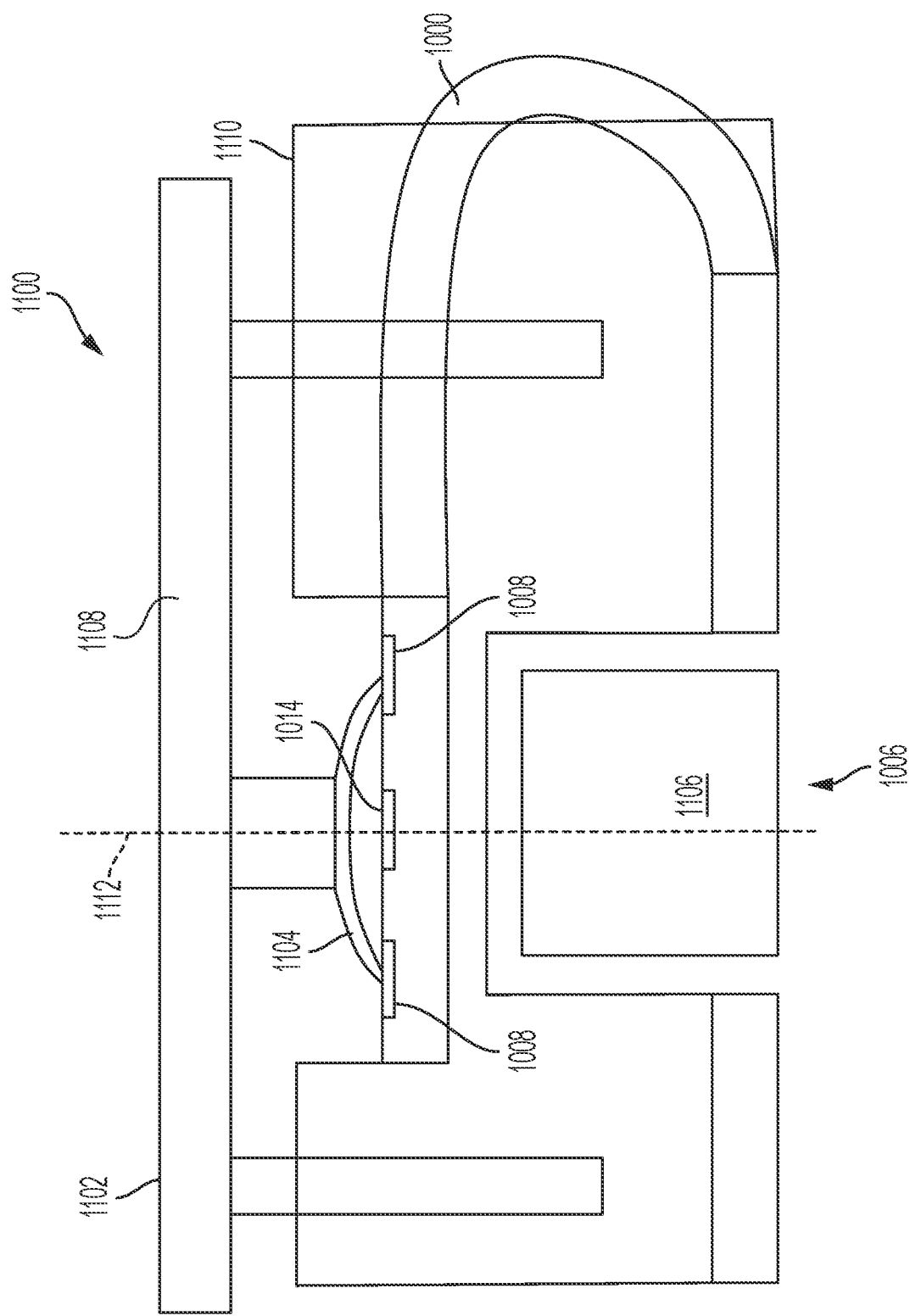
FIG. 8 is a cross-sectional view of an example of a KoD including the flexible printed circuit (FPC) of FIG. 7.

FIG. 8 is a cross-sectional view of an example of a KoD 1100 including an FPC 1000 of FIG. 7. The FPC 1000 is configured in a folded FPC configuration in contrast to the flattened FPC 1000 of FIG. 7, which is in a flat configuration (i.e., not folded). The KoD 1100 includes a dome switch 1104 operably coupled to (e.g., electrically connected and mechanically connected) to the dome switch contacts 1008 (FIG. 7) of the FPC 1000. The KoD 1100 also includes a body 1110 configured to carry the FPC 1000. The KoD 1100 further includes a center retaining spigot 1106 extending through the center hole 1006 of the FPC 1000. In some embodiments, the body 1110 may be configured to rotate around the center retaining spigot 1106. Accordingly, the KoD 1100 is configured to rotate around a central axis 1112 of the KoD 1100. The body 1110, the center retaining spigot 1106, or both may include locking features to secure the center retaining spigot 1106 to the body 1110 in a manner that enables rotation of the body 1110 about the center retaining spigot 1106. By way of non-limiting example, the body 1110 or the center retaining spigot 1106 may include detents (not shown) and the other of the body 1110 or the center retaining spigot 1106 may include detent actuators (not shown) to mechanically connect the body 1110 to the center retaining spigot 1106. In some embodiments, the center retaining spigot 1106 may be configured to be secured (e.g., glued) directly to a touch screen. In some embodiments, one or more intervening structures may be placed between the KoD 1100 and the touch screen. By way of non-limiting example, a base assembly (e.g., base assembly 2318 of FIG. 20, base assembly 2504 of FIG. 21A, base assembly 2504 of FIG. 21B) may be located between the KoD 1100 and the touch screen.

The KoD 1100 also includes an actuator 1108 operably coupled to the dome switch 1104. The actuator 1108 includes a touch surface 1102 (e.g., a top surface of and/or lateral surfaces of the actuator 1108). Accordingly, when a user touches the touch surface 1102, the user's finger may be electrically connected to the dome switch 1104 and the dome switch contacts 1008 via the actuator 1108. For example, responsive to a touch to the touch surface 1102, the finger of the user may be electrically connected to the rotation electrode pad 1012 (FIG. 7), which is electrically connected (e.g., constantly) to the dome switch contacts 1008 via the FPC 1000. As a result, as the user rotates the KoD 1100, the rotation electrode pad 1012 may be constantly detected by a touch sensor of a touch screen that the KoD 1100 is secured to regardless of a position (e.g., depressed position, released position) of the KoD 1100. As a result, as the rotation electrode pad 1012 travels in front of the touch screen of a touch screen device, the touch sensor of the touch screen device may track a position of the rotation electrode pad 1012. The dome switch 1104 is also configured to selectively electrically connect the touch surface 1102 to the push electrode pad 1010 (FIG. 7) of the FPC 1000 via the depress contact 1014 when the KoD 1100 is in the depressed position. As a result, responsive to the user pressing the actuator 1108 with the KoD 1100 is in the depressed position, the touch surface 1102 is electrically connected to the push electrode pad 1010, registering a touch by the touch sensor responsive to the push electrode pad 1010 being electrically connected to the user's finger. Although the push electrode pad 1010 may rotate with rotation of the KoD 1100, a push of the KoD 1100 may be detected responsive to detection of both the push electrode pad 1010 and the rotation electrode pad 1012. Detection of only one pad may be associated with a released state of the KoD 1100.

FIGS. 9A-9C are a set of views of a portion 1208 of a two PCB KoD, according to some embodiments. FIG. 9A is a top perspective view, FIG. 9B is a bottom perspective view, and FIG. 9C is a top perspective view having a dome switch 1228 of the portion 1208. The portion 1208 includes a bottom PCB 1214, a top PCB 1218, and detent actuators 1216 between the bottom PCB 1214 and the top PCB 1218. An adhesive may be used to connect the various layers of the portion 1208. By way of non-limiting example, an adhesive may be used between the bottom PCB 1214 and the detent actuators 1216 to secure the bottom PCB 1214 to the detent actuators 1216. Also, an adhesive may be used between the detent actuators 1216 and the top PCB 1218 to secure the detent actuators 1216 to the top PCB 1218.

FIG. 9B illustrates that the bottom PCB 1214 includes a rotation electrode pad 1210 and a push electrode pad 1212 (e.g., metal electrodes such as copper electrodes). Accordingly, if a different number, size, or configuration of electrode pads is desired, the bottom PCB 1214 may be easily replaced with a different bottom PCB having electrode pads of the desired number, size, and configuration. FIG. 9A and FIG. 9C illustrate that the top PCB 1218 includes a dome switch pad 1222 configured to mount a dome switch 1228 thereto and a rotation trace 1226 configured to electrically connect the dome switch pad 1222 to the rotation electrode pad 1210. The top PCB 1218 also includes a push contact 1220 configured to electrically connect to the dome switch 1228 responsive to a depressed position of the dome switch 1228 and to electrically isolate from the dome switch 1228 responsive to a released position of the dome switch 1228. The top PCB 1218 further includes a push contact trace 1224 configured to electrically connect the push contact 1220 to the push electrode pad 1212.

FIG. 10 is a cross-sectional view of a two PCB KoD 1300 including the portion 1208 of FIGS. 9A-9C, according to some embodiments. FIG. 11A is a cross-sectional view of another two PCB KoD 1400, according to some embodiments. The KoD 1300 of FIG. 10 includes a touch cap 1306 on a cushion 1304. The KoD 1400 of FIG. 11A includes a touch cap 1308 held in place via clips 1320. The KoD 1300 and the KoD 1400 illustrate the portion 1208 including the bottom PCB 1214, the detent actuators 1216, and the top PCB 1218, and the dome switch 1228 on the top PCB 1218. The KoD 1300 and the KoD 1400 also include a hub 1310 extending through the bottom PCB 1214. The hub 1310 may be configured to secure to a touch screen (e.g., the touch screen 702 of FIG. 4). By way of non-limiting example, the hub 1310 may secure to the touch screen by an adhesive 1316 on the bottom of the hub 1310. Similar to rotation of the KoD 1100 around the center retaining spigot 1106 of FIG. 8, the portion 1208 is configured to rotate about the hub 1310 to enable movement of the rotation electrode pad 1210 (FIG. 9B) as the portion 1208 rotates. In some embodiments, the hub 1310 may include detents 1312 configured to provide mechanical resistance against the detent actuators 1216 as the portion 1208 rotates relative to the hub 1310. The detent actuators 1216 and the detents 1312 may also function as locking features 1330 between the portion 1208 and the hub 1310 to secure the portion 1208 to the hub 1310 in a manner that enables rotation of the portion 1208 about the hub 1310.

The KoD 1300 includes a touch cap 1306 operably coupled to the dome switch 1228 to enable a user to depress the dome switch 1228 into a depressed position by pressing on the touch cap 1306. The KoD 1300 also includes the cushion 1304 positioned on the top PCB 1218 at a perimeter of the top PCB 1218. The cushion 1304 is configured to compress responsive to a press of the touch cap 1306 to enable the touch cap 1306 to displace relative to the portion 1208. By way of non-limiting example, the cushion 1304 may include an open cell foam or other material (e.g., a resilient polymer) or object (e.g., a spring) that compresses and returns to its pre-compressed volume and shape.

The touch cap 1306 includes a touch surface 1314 thereon. At least a portion of the touch cap 1306 includes an electrically conductive material to electrically connect the touch surface 1314 to the dome switch 1228. Accordingly, when a user touches the touch surface 1314, the user's finger is electrically connected to the dome switch 1228. Since the dome switch 1228 is constantly electrically connected to the rotation electrode pad 1210, the user's finger is electrically connected to the rotation electrode pad 1210 in both the depressed position of the KoD 1300 and in the released position of the KoD 1300. Also, the user's finger is electrically connected to the push electrode pad 1212 (FIG. 9B) when the KoD 1300 is in the depressed position and electrically isolated from the push electrode pad 1212 when the KoD 1300 is in the released position.

The KoD 1400 also includes a touch cap 1308 operably coupled to the dome switch 1228 to enable a user to depress the dome switch 1228 into a depressed position by pressing on the touch cap 1308. The touch cap 1308 includes touch cap sides 1318 that extend down around lateral sides of the portion 1208 to guide the touch cap 1308 as the touch cap is depressed into the depressed position. The KoD 1400 also includes clips 1320 extending through the top PCB 1218 to hold the touch cap 1308 in place relative to the portion 1208. The detent actuators 1216 may include passageways 1322 to enable the clips 1320 to traverse through the detent actuators 1216. The top PCB 1218 may also include passageways for the clips 1320 to extend through, though a distal end of each of the clips 1320 may have a horizontal dimension that is larger than the passageways through the top PCB 1218 to prevent the touch cap 1308 from being pulled away from the portion 1208. A proximal end of each of the clips 1320 may be secured to the touch cap 1308.

The touch cap 1308 includes a touch surface 1324 thereon. The touch surface 1324 may extend along a top surface of the touch cap 1308 and/or along outside surfaces of the sides 1318 of the touch cap 1308. At least a portion of the touch cap 1308 includes an electrically conductive material to electrically connect the touch surface 1324 to the dome switch 1228. Accordingly, when a user touches the touch surface 1324, the user's finger is electrically connected to the dome switch 1228. Since the dome switch 1228 is constantly electrically connected to the rotation electrode pad 1210, the user's finger is electrically connected to the rotation electrode pad 1210 in both the depressed position of the KoD 1400 and in the released position of the KoD 1400. Also, the user's finger is electrically connected to the push electrode pad 1212 when the KoD 1400 is in the depressed position and electrically isolated from the push electrode pad 1212 when the KoD 1400 is in the released position.

Figure 11B:
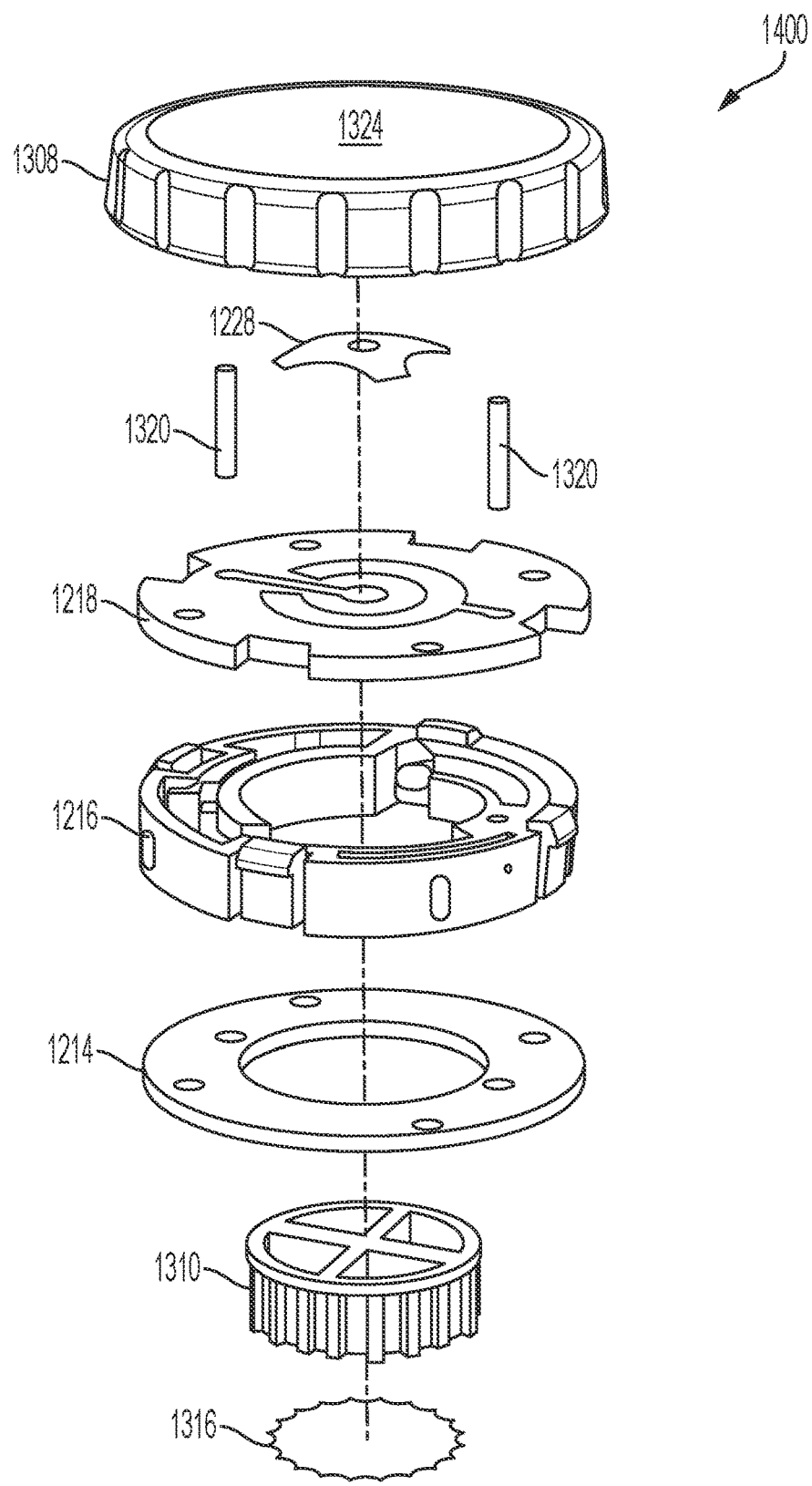
FIG. 11B is an exploded view of an example of the KoD of FIG. 11A.

FIG. 11B is an exploded view of an example of the KoD 1400 of FIG. 11A. As previously discussed, the KoD 1400 includes a touch cap 1308 having a touch surface 1324 thereon, a dome switch 1228, clips 1320 (e.g., electrically conductive clips), a top PCB 1218, detent actuators 1216, a bottom PCB 1214, a hub 1310, and adhesive 1316 (e.g., adhesive for applying the KoD 1400 to a touch screen of a touch screen device).

FIGS. 11C-11H are various views of the KoD 1400 of FIG. 11A and FIG. 11B.

Figure 11E:
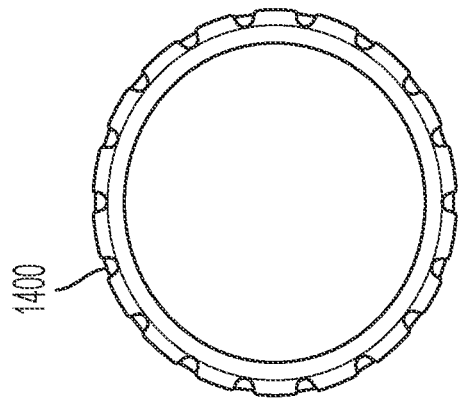
FIGS. 11C-11H are various views of the KoD of FIG. 11A.
Figure 11H:
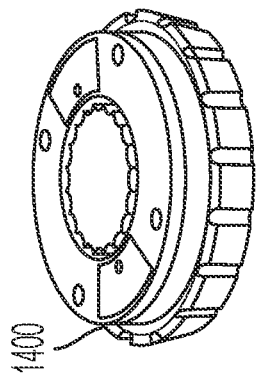
Figure 11D:
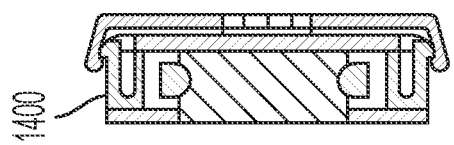
Figure 11G:
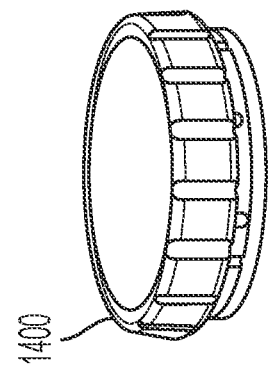
Figure 11C:
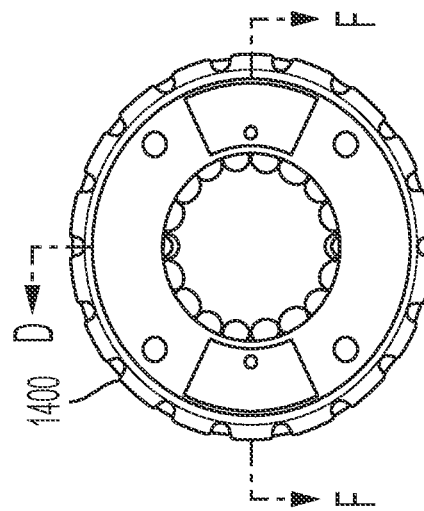
Figure 11F:
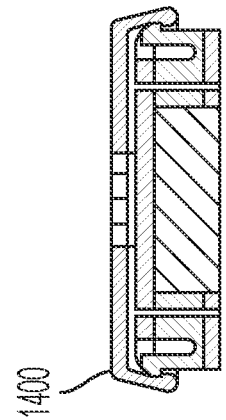

FIG. 11C is a bottom view, FIG. 11D is a cross-sectional view taken through a cross section D-D of FIG. 11C, FIG. 11E is a top view, FIG. 11F is a cross-sectional view taken through a cross section F-F of FIG. 11C, FIG. 11G is a top perspective view, and FIG. 11H is a bottom perspective view.

Figure 12:
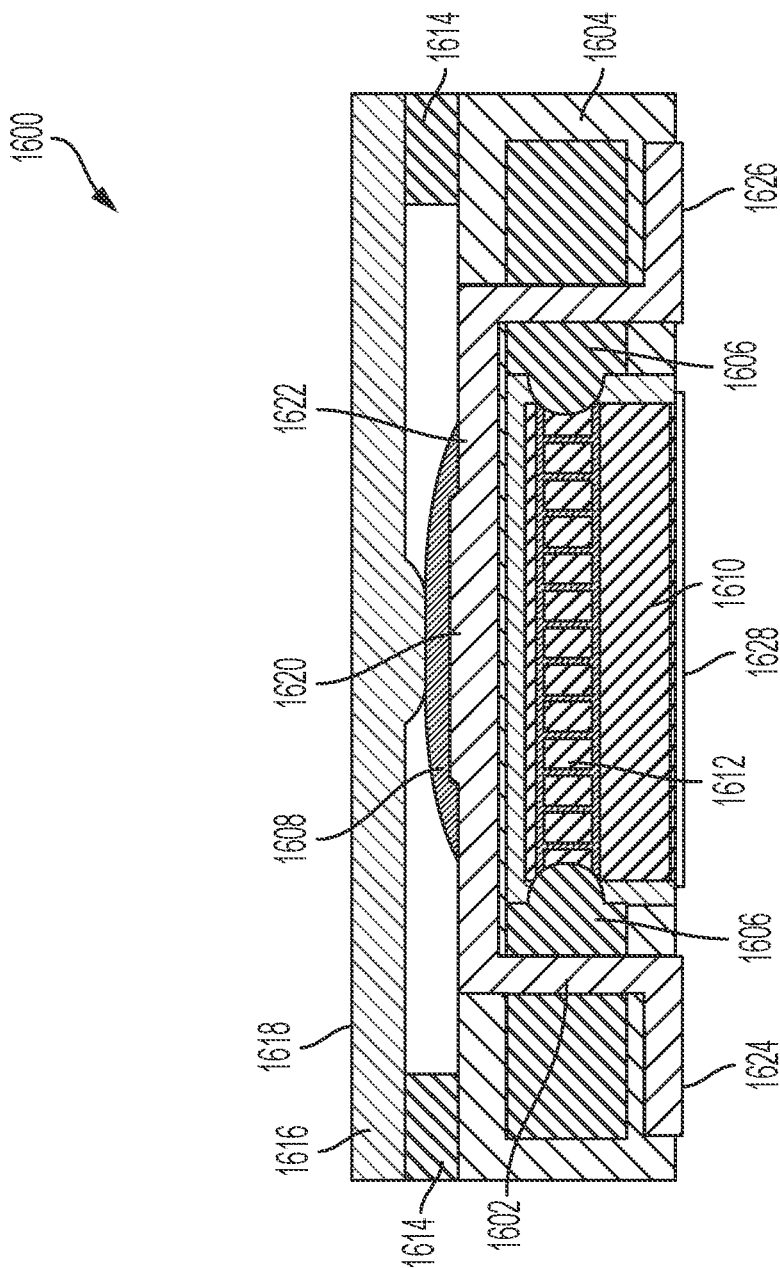
FIG. 12 is a cross-sectional view of an injection molded KoD, according to some embodiments.

FIG. 12 is a cross-sectional view of an injection molded KoD 1600, according to some embodiments. By way of non-limiting example, the KoD 1600 may include a twin-shot injection molded KoD. The KoD 1600 may bear some similarity to the KoD 1300 of FIG. 10. For example, the KoD 1600 includes detent actuators 1606, a hub 1610, detents 1612, an adhesive 1628, a touch cap 1616, a touch surface 1618, a dome switch 1608, and a cushion 1614 similar to the detent actuators 1216, the hub 1310, the detents 1312, the adhesive 1628, the touch cap 1306, the touch surface 1314, the dome switch 1228, and the cushion 1304 of the KoD 1300 of FIG. 10, respectively. Rather than the bottom PCB 1214 and the top PCB 1218 of the KoD 1300 of FIG. 10, however, the KoD 1600 includes a substrate 1604 (e.g., an ABS substrate) and an overmold 1602 (e.g., a conductive overmold).

The overmold 1602 includes electrically conductive structures such as a push electrode pad 1624, a rotation electrode pad 1626, a dome switch pad 1622, and a push contact 1620, which are similar to the push electrode pad 1212, the rotation electrode pad 1210, the dome switch pad 1222, and the push contact 1220 of FIGS. 9A-9C. In contrast to conductive trace material on a PCB, such as their counterparts in the KoD 1300 of FIG. 10, however, the push electrode pad 1624, the rotation electrode pad 1626, the dome switch pad 1622, and the push contact 1620 may include an injection material. By way of non-limiting example, the injection material may include an electrically conductive polymer, an electrically insulating polymer coated in an electrically conductive material, or other conductive overmold material. The push electrode pad 1624 is electrically connected to the push contact 1620 via the overmold 1602. Also, the rotation electrode pad 1626 is electrically connected to the dome switch pad 1622 via the overmold 1602. The push electrode pad 1624 and the push contact 1620, however, are electrically insulated from the rotation electrode pad 1626 and the dome switch pad 1622 by the substrate 1604. It is noted that for the sake of simplicity the push electrode pad 1624, the push contact 1620, the rotation electrode pad 1626, and the dome switch pad 1622, as illustrated in FIG. 12, are not shown in detail to illustrate their separate structures. Such detail, however, is shown in FIGS. 13A and 13B.

The substrate 1604 is configured to provide structural support to the overmold 1602 and insulate the push electrode pad 1624 and the push contact 1620 from the rotation electrode pad 1626 and the dome switch pad 1622. The substrate 1604 includes an electrically insulating material. More details regarding the KoD 1600 are illustrated in FIGS. 13A and 13B.

Figure 13B:
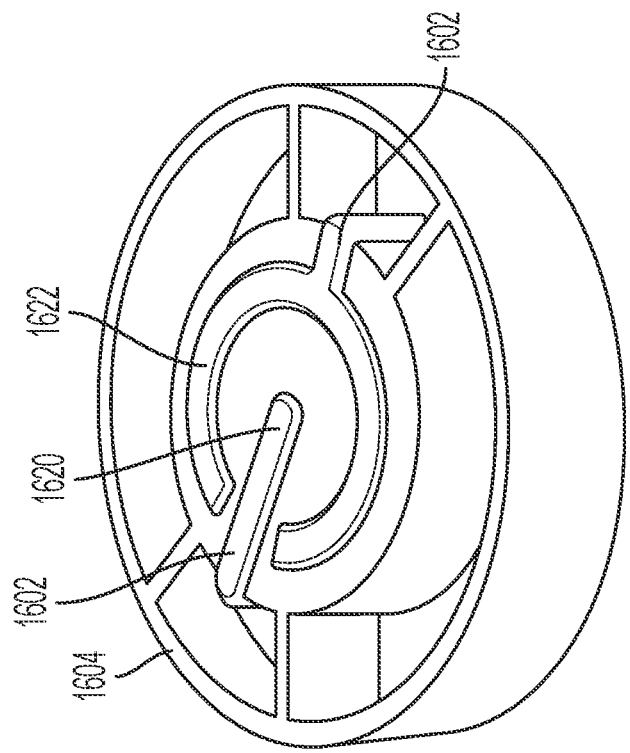
FIGS. 13A and 13B are respective views of an example of a substrate and an overmold of the KoD of FIG. 12.
Figure 13A:
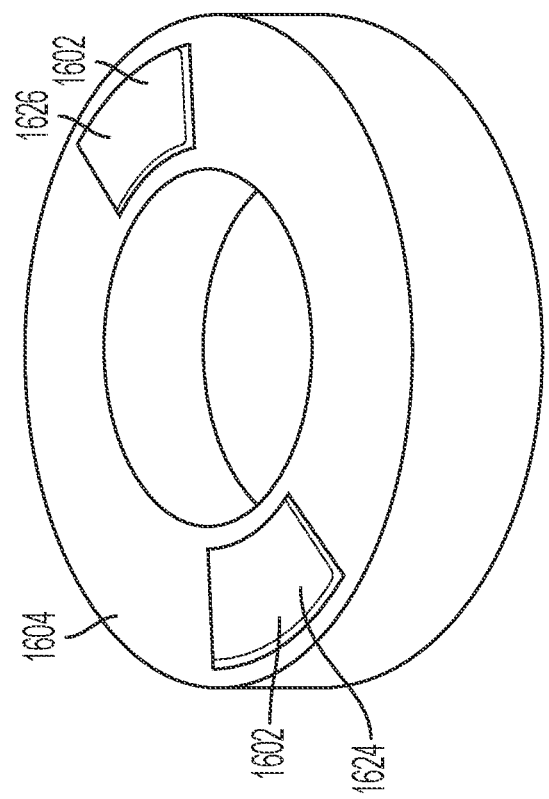

FIGS. 13A and 13B are views of an example of a substrate 1604 and an overmold 1602 of the KoD 1600 of FIG. 12. FIG. 13A is a bottom perspective view and FIG. 13B is a top perspective view of the substrate 1604 and the overmold 1602. FIG. 13A illustrates the push electrode pad 1624 and the rotation electrode pad 1626. FIG. 13B illustrates the push contact 1620 and the dome switch pad 1622.

Figure 14B:
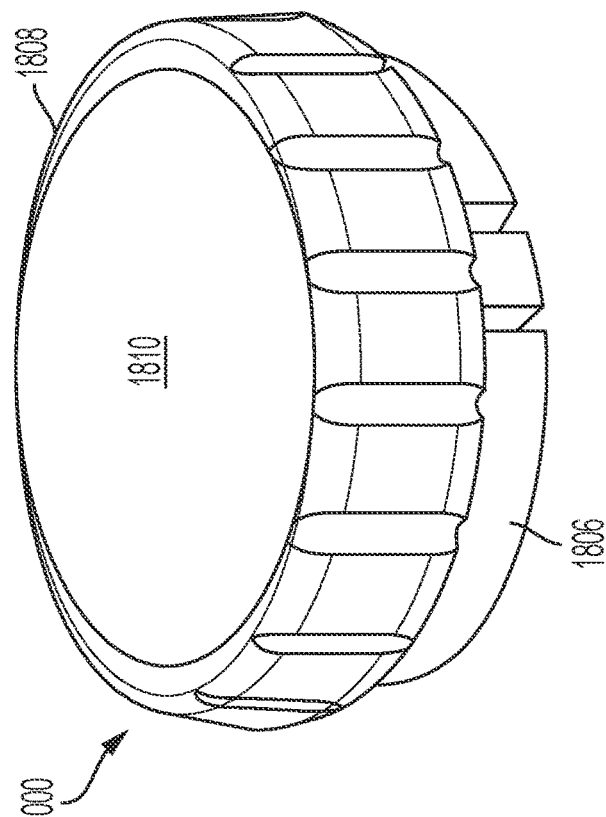
FIGS. 14A and 14B are views of another KoD, according to some embodiments.
Figure 14A:
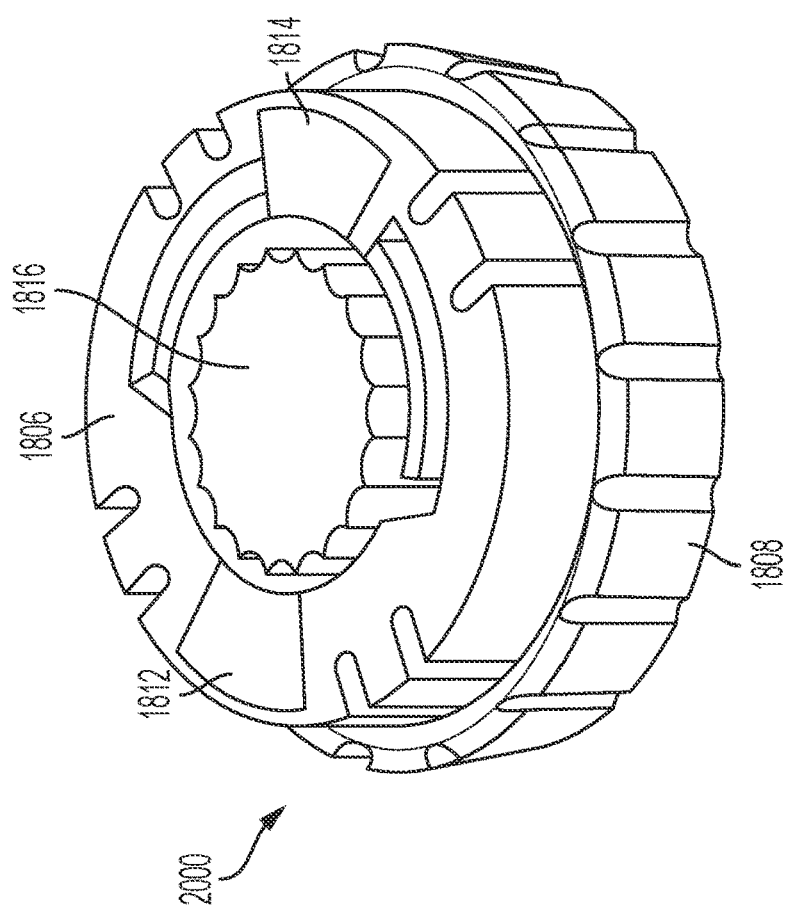

FIGS. 14A and 14B depict a set of views of another KoD 2000, according to some embodiments. FIG. 14A is a bottom perspective view and FIG. 14B is a top perspective view of the KoD 2000. The KoD 2000 includes an overmold structure 1806 and a touch cap 1808. The touch cap 1808 includes a touch surface 1810. The overmold structure 1806 includes a push electrode pad 1812 and a rotation electrode pad 1814. The touch surface 1810 is electrically connected to the rotation electrode pad 1814 regardless of whether the KoD 2000 is in a depressed position or in a released position. The touch surface 1810 is electrically connected to the push electrode pad 1812 responsive to the KoD 2000 being in a depressed position. The touch surface 1810 is electrically isolated from the push electrode pad 1812 responsive to the KoD 2000 being in a released position.

The KoD 2000 also includes a hub 1816 inserted into the overmold structure 1806. The hub 1816 is configured to secure to a touch screen, and the overmold structure 1806 is configured to rotate around the hub 1816. Accordingly, the rotation electrode pad 1814 is configured to move along the touch screen in a rotational direction around the hub 1816 responsive to rotation of the overmold structure 1806 about the hub 1816. The push electrode pad 1812 may also rotate about the hub 1816. As a result, both the push electrode pad 1812 and the rotation electrode pad 1814 may be detected responsive to a depressed position of the KoD 2000 and a touch to the touch surface 1810. In such a depressed position of the KoD 2000 rotation of the KoD may be tracked by tracking rotation of the rotation electrode pad 1814, the push electrode pad 1812, or both.

FIGS. 15A-15C are views of an example of the overmold structure 1806 of the KoD 2000 of FIGS. 16A and 16B. FIG. 15A is a top perspective view, FIG. 15B is a bottom perspective view, and FIG. 15C is a side perspective view of the overmold structure 1806 including an overmold 1916 positioned within a substrate 1918. The overmold structure 1806 includes an overmold 1916 and a substrate 1918 configured to carry the overmold 1916. In some embodiments, the overmold 1916 is configured to snap-fit within the substrate 1918. In some embodiments, the overmold 1916 and/or the substrate 1918 includes one or more structures configured to mate with one or more recesses of the substrate 1918 and/or the overmold 1916.

FIG. 16 is a side perspective view of the overmold 1916 of the overmold structure 1806 of FIGS. 15A-15C. The overmold 1916 includes a dome switch pad 1922 electrically connected to the rotation electrode pad 1814. The dome switch pad 1922 is configured to enable a dome switch to be mounted thereto. The dome switch is operably coupled to the touch cap 1808 such that the touch surface 1810 of the touch cap 1808 is electrically connected to the dome switch pad 1922 and the rotation electrode pad 1814 through the dome switch responsive to both the depressed position and the released position of the KoD 2000.

The overmold 1916 also includes a push contact 1920 electrically connected to the push electrode pad 1812. The push contact 1920 is configured to electrically connect to the touch surface 1810 (FIG. 14B) of the touch cap 1808 (FIGS. 14A and 14B) responsive to a depressed position of the KoD 2000 (FIGS. 14A and 14B). By way of non-limiting example, the dome switch may be configured to contact the push contact 1920 responsive to the depressed position of the KoD 2000. Also, the dome switch may be configured to not contact the push contact 1920 responsive to the released position of the KoD 2000.

FIG. 17 is a top perspective view of the substrate 1918 of the overmold structure 1806 of FIGS. 15A-15C. The substrate 1918 includes cap clips 1912 configured to secure the touch cap 1808 (FIGS. 14A and 14B) to the overmold structure 1806. The substrate 1918 also includes detent actuators 1914 (e.g., spring detent actuators) configured to mate with detents in the hub 1816 (FIG. 14A). In some embodiments, the detent actuators 1914 are mirrored (e.g., bilaterally symmetric) as illustrated in FIG. 17 to provide a similar experience to a user rotating the KoD 2000 in both directions of rotation of the KoD 2000.

Figure 18A:
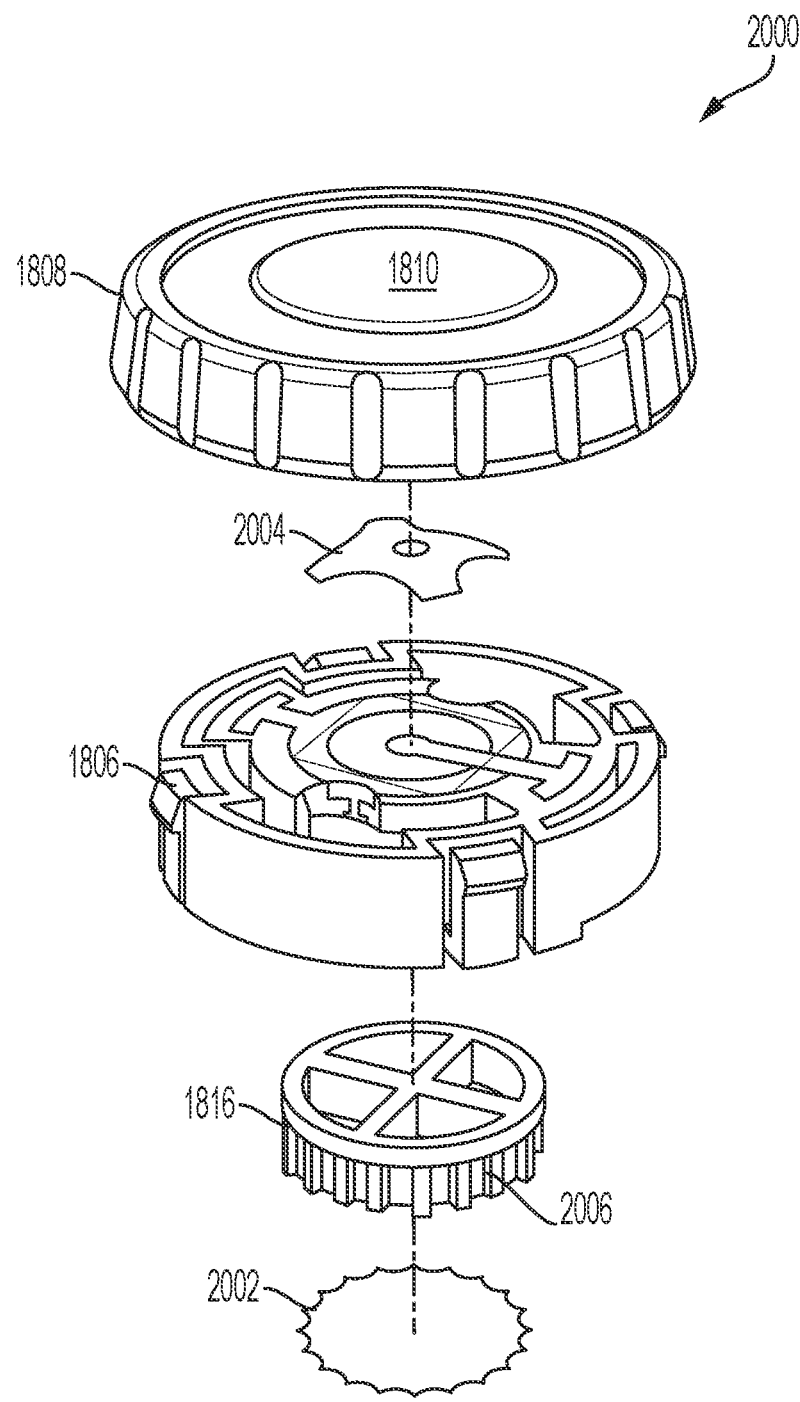

FIGS. 18A-18F are views of the KoD 2000 of FIGS. 14A and 14B. FIG. 18A is an exploded view of the KoD 2000 of FIGS. 14A and 14B. As previously discussed, the KoD 2000 includes the touch cap 1808 having the touch surface 1810, a dome switch 2004, an overmold structure 1806, a hub 1816 having detents 2006 (configured to mate with the detent actuators 1914 of FIG. 17), and adhesive 2002 (e.g., to secure the hub 1816 to a touch screen device).

FIGS. 18B-18F are other views of the KoD 2000 of FIGS. 14A-14B and FIG. 18A, with callouts identifying the various elements as indicated above. FIG. 18B is a bottom view, FIG. 18D is a top view, FIG. 18C is a cross-sectional view taken along line C-C of FIG. 18B, FIG. 18E is a cross-sectional view taken along cross section E-E of FIG. 18B, and FIG. 18F is a cross-sectional view taken along cross section F-F of FIG. 18B.

Figure 19:
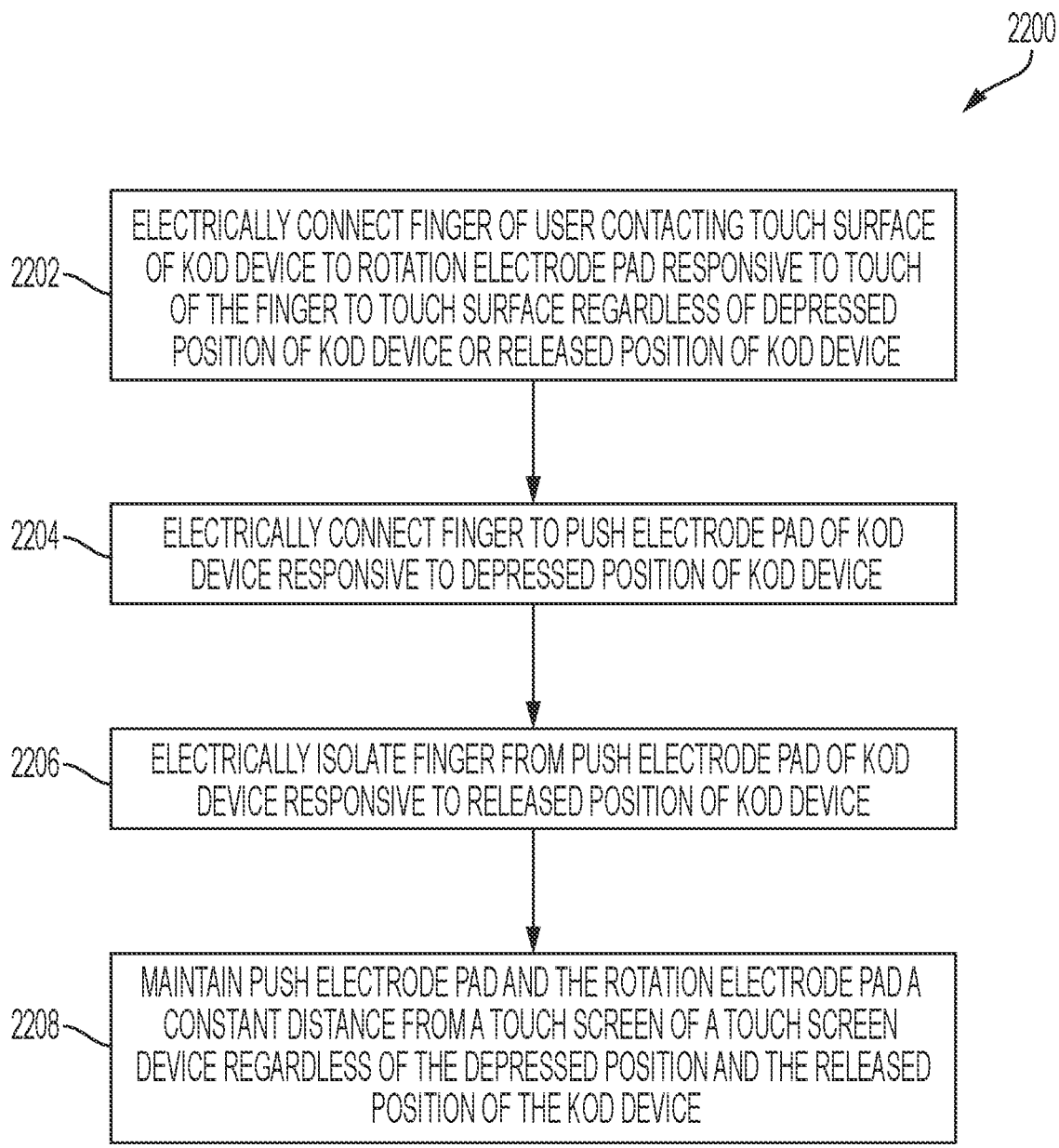
FIG. 19 is a flowchart illustrating a method of operating a KoD device, according to some embodiments.

FIG. 19 is a flowchart illustrating a method 2200 of operating a KoD device (e.g., any of the KoD devices disclosed herein), according to some embodiments. At operation 2202, method 2200 includes electrically connecting a finger of a user contacting a touch surface of a KoD device to a rotation electrode pad responsive to a touch of the finger to the touch surface regardless of a depressed position of the KoD device or a released position of the KoD device.

At operation 2204, method 2200 includes electrically connecting the finger to a push electrode pad of the KoD device responsive to the depressed position of the KoD device. In some embodiments, electrically connecting the finger to the push electrode pad responsive to the depressed position comprises contacting a push contact with a dome switch electrically connected to the touch surface responsive to depression of the dome switch to the push contact, the push contact electrically connected to the push electrode pad.

At operation 2206, method 2200 includes electrically isolating the finger from the push electrode pad of the KoD device responsive to the released position of the KoD device. In some embodiments, electrically isolating the finger from the push electrode pad responsive to the released position comprises electrically isolating a push contact from a dome switch electrically connected to the touch surface, the push contact electrically connected to the push electrode pad.

At operation 2208, method 2200 includes maintaining the push electrode pad a constant distance from a touch screen of a touch screen device regardless of the depressed position and the released position of the KoD device.

Figure 20:
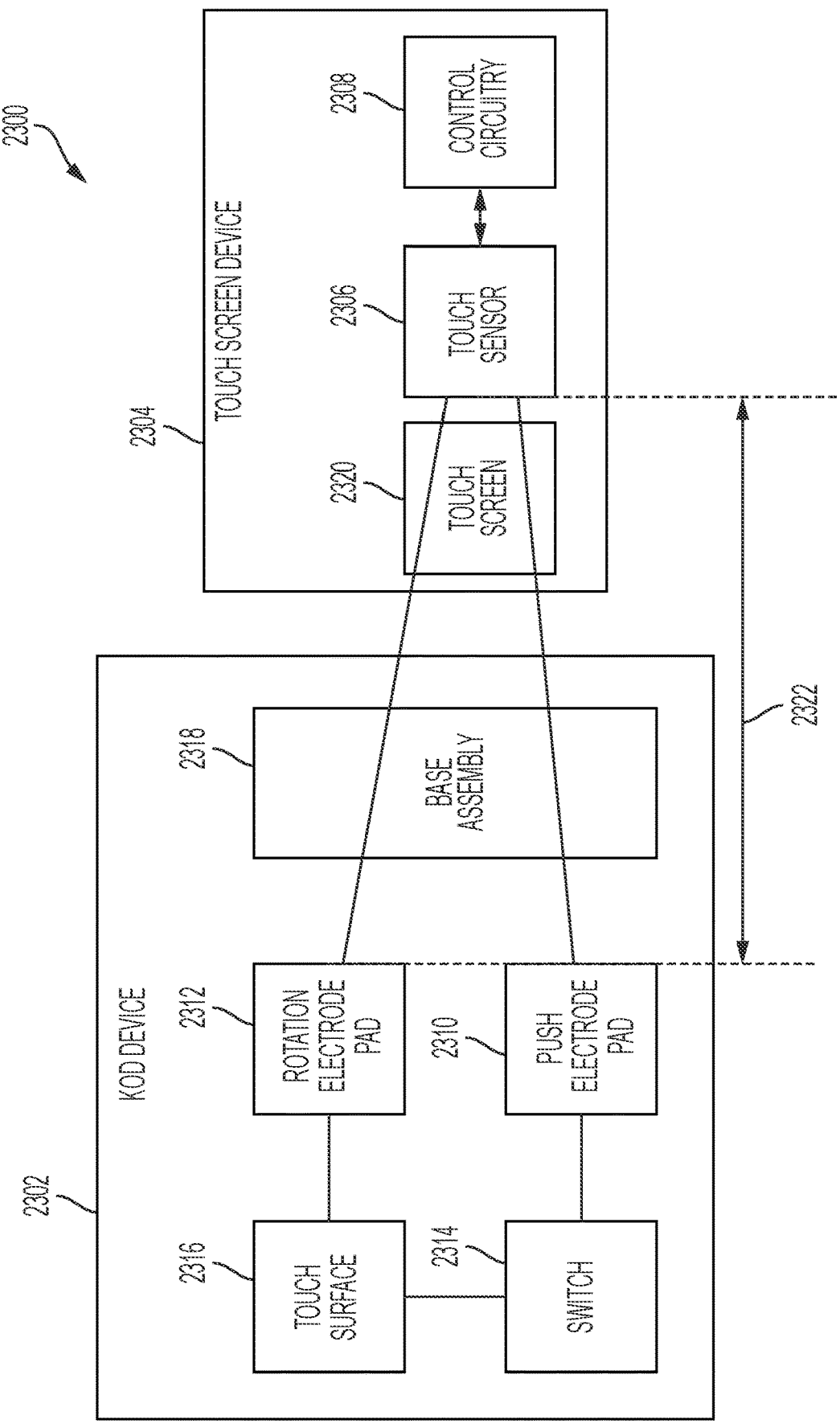
FIG. 20 is a block diagram of a second embodiment of a KoD system, according to some embodiments.

FIG. 20 is a block diagram of a KoD system 2300, according to some embodiments. The KoD system 2300 may be similar to the KoD system 100 of FIG. 1. For example, the KoD system 2300 includes a KoD device 2302 and a touch screen device 2304 similar to the KoD 102 and the touch screen device 104 of FIG. 1. Similar to the control circuitry 108 and the touch sensor 106 of the touch screen device 104 of FIG. 1, the touch screen device 2304 includes control circuitry 2308 operably coupled to a touch sensor 2306. The KoD device 2302 includes a touch surface 2316, a switch 2314, a rotation electrode pad 2312, and a push electrode pad 2310 similar to the touch surface 116, the switch 114, the rotation electrode pad 112, and the push electrode pad 110 of FIG. 1. The at least one electrode (e.g., the push electrode pad 2310, the rotation electrode pad 2312) includes an electrically conductive material. The touch surface 2316 is electrically connected to the rotation electrode pad 2312, and selectively electrically connected to the push electrode pad 2310 through the switch 2314. The KoD device 2302 is configured to be mounted to a touch screen 2320 of the touch screen device 2304 with the at least one electrode (e.g., rotation electrode pad 2312 and the push electrode pad 2310) in engagement proximity to the touch sensor 2306. By way of non-limiting example, the rotation electrode pad 2312 and the push electrode pad 2310 may be positioned a constant distance from the touch screen 2320 of the touch screen device 2304.

The KoD device 2302 also includes a base assembly 2318 configured to be positioned between the touch screen 2320 of the touch screen device 2304 and the push electrode pad 2310 and the rotation electrode pad 2312. The at least one electrode is configured to interact with the touch sensor 2306 through the base assembly 2318 and the touch screen 2320. For example, the base assembly 2318 may be sufficiently thin to enable the touch sensor 2306 to detect the at least one electrode (e.g., the push electrode pad 2310 and the rotation electrode pad 2312) through the base assembly 2318 and the touch screen 2320. In other words, the at least one electrode is in engagement proximity 2322 to the touch sensor 2306 through the base assembly. In some embodiments, the base assembly 2318 is configured to at least partially cover an end of the KoD device 2302 that includes the one or more electrodes. A thickness of the base assembly 2318, including an adhesive that secures the base assembly 2318 to the touch screen device 2304, may be about 0.5 millimeters (0.5 mm) or less, without limitation.

Figure 21A:
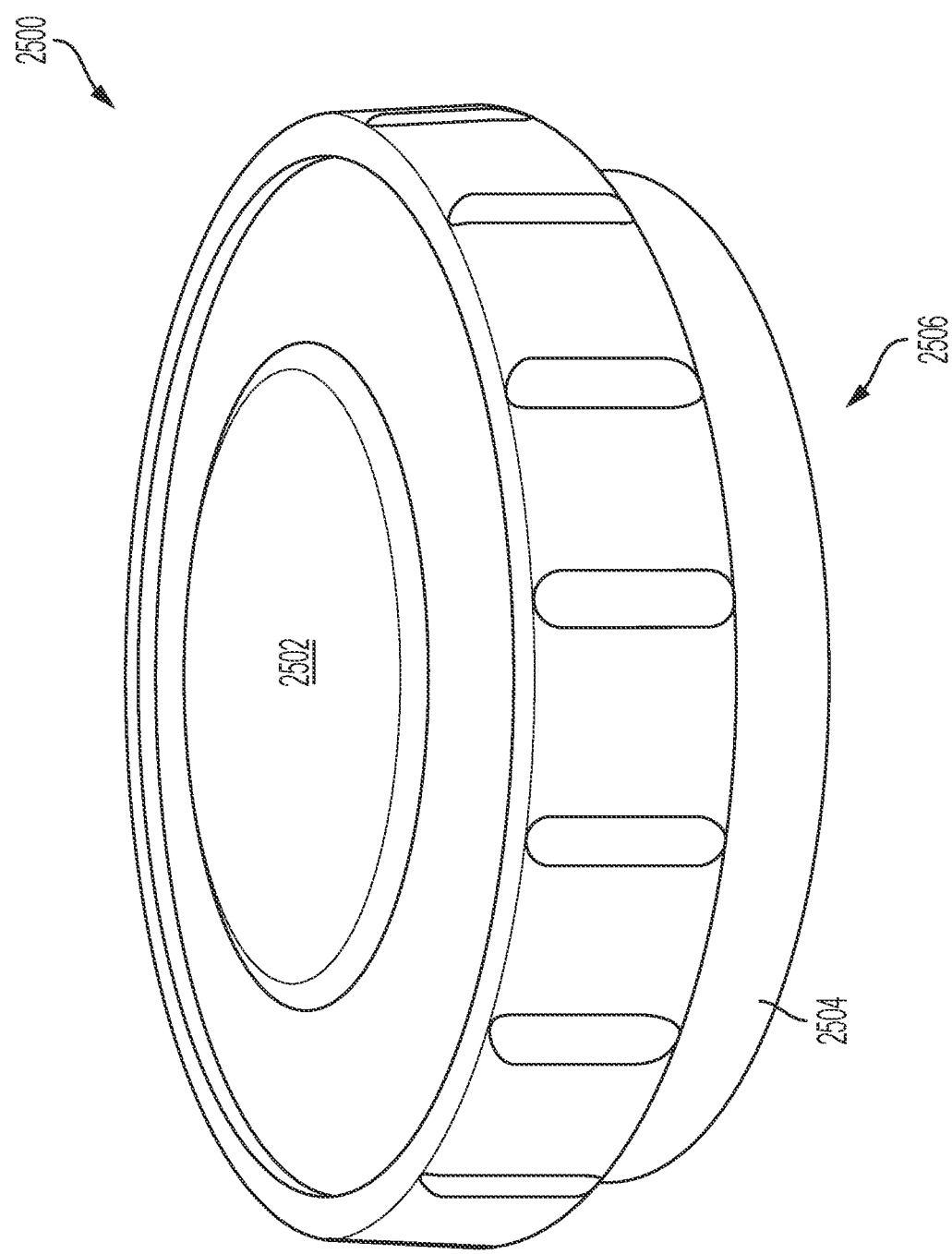
Figure 21B:
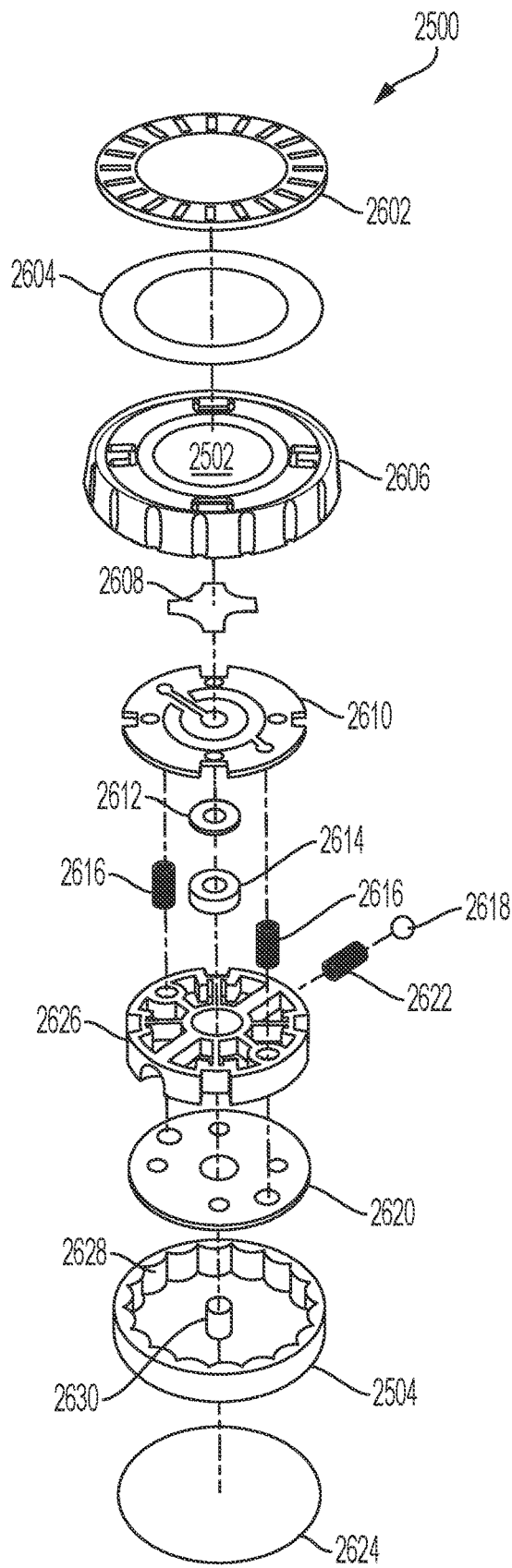

In some embodiments, the base assembly 2318 includes one or more side walls extending toward a conductive cap of the KoD device 2302 (e.g., at least partially housing an inner housing such as an inner housing 2626 of FIG. 21B). In some embodiments, the KoD device 2302 includes one or more seals between the one or more side walls of the base assembly 2318 and the conductive cap to seal an interior of the KoD device 2302 (e.g., against liquids, dust, dirt, or other contaminants). In some embodiments, the base assembly 2318 includes a post (e.g., a post 2630 of FIG. 21B) configured to extend therefrom into an inner housing (e.g., the inner housing 2626 of FIG. 21B) of the KoD device 2302 to enable the inner housing to rotate about the post. Rotation of the inner housing may enable rotation of the rotation electrode pad 2312 and the push electrode pad 2310, which are mechanically coupled to the inner housing, about the post with the inner housing. In some embodiments, the base assembly includes detents (e.g., detents 2628 of FIG. 21B) and the inner housing includes detent actuators (e.g., detent ball 2618 and detent spring 2622 of FIG. 21B) to provide mechanical resistance and, in some instances, a tactile "click" feedback, to rotation of the inner housing about the post. The detents and the detent actuators may function as a locking mechanism to secure the base assembly to the inner housing while allowing the inner housing to rotate about the post and within the base assembly.

The KoD device 2302 includes a touch surface 2316 including a conductive material, the touch surface 2316 configured to be positioned in a released position by default and in a depressed position responsive to pressure applied to the touch surface 2316 (the pressure closing the switch 2314 so as to electrically connect touch surface 2316 to the push electrode pad 2310). The KoD device 2302 also includes the push electrode pad 2310 configured to be positioned in engagement proximity to a touch sensor 2306 of a touch screen device 2304 in both the released position and the depressed position. For example, the touch push electrode pad 2310 may be positioned constant distances from the touch screen 2320 and the touch sensor 2306 regardless of the released position and the depressed position of the KoD device 2302. The push electrode pad 2310 is electrically connected to the conductive material of the touch surface 2316 responsive to the depressed position and electrically isolated from the conductive material of the touch surface 2316 responsive to the released position. The KoD device 2302 further includes a rotation electrode pad 2312 configured to be positioned in engagement proximity to the touch sensor 2306 of the touch screen device 2304 in both the released position and the depressed position. For example, the rotation electrode pad 2312 may be positioned constant distances from the touch screen 2320 and the touch sensor 2306 regardless of the released position and the depressed position of the KoD device 2302. The rotation electrode pad 2312 is electrically connected to the conductive material of the touch surface 2316 in both the released position and the depressed position.

In some embodiments, the base assembly 2318 is configured to carry an adhesive (e.g., adhesive 2624 of FIG. 21B) on a side of the base assembly 2318 that is opposite to the at least one electrode (e.g., a surface of the base assembly 2318 that faces the touch screen 2320 of the touch screen device 2304). The adhesive is configured to secure the KoD device 2302 to the touch screen 2320 of the touch screen device 2304. Accordingly, the base assembly 2318 is configured to be secured to the touch screen 2320. In some embodiments, at least substantially the entire side of the base assembly that is opposite to the at least one electrode is configured to carry the adhesive.

In some embodiments, the KoD device 2302 further includes an FPC configured to electrically connect the push electrode pad 2310 and the rotation electrode pad 2312 to the touch surface 2316. In some embodiments, the KoD device 2302 includes a PCB configured to electrically connect the rotation electrode pad 2312 to the touch surface 2316 and further switchably connect the push electrode pad 2310 to the touch surface 2316. In some embodiments, the KoD device 2302 includes a folded FPC configured to electrically connect the rotation electrode pad 2312 to the touch surface 2316 and further switchably connect the push electrode pad 2310 to the touch surface 2316. In some embodiments, the KoD device 2302 includes a conductive overmold including the push electrode pad 2310 and the rotation electrode pad 2312.

In some embodiments, a distance between the released position of the touch surface 2316 and the depressed position of the touch surface 2316 is less than one millimeter (e.g., 0.3 mm to 1 mm). In some embodiments, a distance between the released position of the touch surface 2316 and the depressed position of the touch surface 2316 is about 0.6 mm. In some embodiments, the push electrode pad 2310 is configured to remain in an electrically floating state responsive to the touch surface 2316 being in a released position. The KoD device 2302 further includes a switch 2314 configured to selectively operably couple the push electrode pad 2310 to the conductive material of the touch surface 2316 responsive to the depressed position. In some embodiments, the switch 2314 includes a dome switch.

Similar to the KoD 102 of FIG. 1, the KoD device 2302 may include any KoD such as the KoD 300, the KoD 1100, the KoD 1300, the KoD 1400, the KoD 1600, the KoD 2000, or other KoD devices with the addition of the base assembly 2318. By way of non-limiting example, the KoD device 2302 may include an overmold inner housing implementation (e.g., similar to the KoD 1600 or the KoD 2000) with the addition of the base assembly.

FIGS. 21A-21J are views of a KoD device 2500, which is an example of the KoD device 2302 of FIG. 20. FIG. 21A is a perspective view of the KoD device 2500. The KoD device 2500 includes a touch surface 2502 and a base assembly 2504. The base assembly 2504 includes a side 2506 that is configured to adhere to a touch screen of a touch screen device. The side 2506 of the base assembly 2504 is configured to face the touch screen and is opposite to a side of the base assembly 2504 that faces one or more electrodes of the KoD device 2500. To adhere the KoD device 2500 to the touch screen, adhesive may be applied to at least substantially an entire surface of the side 2506 of the base assembly 2504 that is opposite to the side of the base assembly 2504 that faces the one or more electrodes.

FIG. 21B is an exploded view of the KoD device 2500 of FIG. 21A. The KoD device 2500 includes a conductive decorative ring 2602 (e.g., including laser cut metal), a ring adhesive 2604 (e.g., may be replaced with clips to clip the conductive decorative ring 2602 to the conductive cap 2606), a conductive cap 2606 (e.g., including the touch surface 2502), a dome switch 2608, a dome PCB 2610, a starlock retainer 2612, a bearing 2614, connection springs 2616 (e.g., two connection springs), a detent ball 2618 (e.g., a ball to serve as a detent actuator, in some instances, a 3 mm ball formed of a thermoplastic such as Delrin®), an electrode PCB 2620 (e.g., including at least one electrode such as the rotation electrode pad 2312 and/or the push electrode pad 2310 of FIG. 20), a detent spring 2622, a base assembly 2504 (e.g., formed of ABS), and an adhesive 2624 (e.g., 467 adhesive by 3M). In some embodiments, the adhesive 2624 may be sized to cover at least substantially an entire surface of the side 2506 of the base assembly 2504 that is opposite to one or more electrodes of the electrode PCB 2620 (i.e., the side 2506 of the base assembly 2504 that is configured to face the touch screen device). For example, as illustrated in FIG. 21B, the adhesive 2624 is the same size as the side 2506 of the base assembly 2504.

The base assembly 2504 and the conductive cap 2606 together encase the other components (e.g., the electrode PCB 2620, the inner housing 2626, the detent spring 2622, the detent ball 2618, the bearing 2614, the connection springs 2616, the starlock retainer 2612, the dome PCB 2610, and the dome switch 2608). The base assembly 2504 may be directly secured to a touch screen (e.g., touch screen 2320 of FIG. 20) with adhesive 2624. The base assembly 2504 may also include detents 2628 to engage with the detent ball 2618 and provide mechanical resistance to rotation of the KoD device 2500 and mechanically secure the base assembly 2504 to the inner housing 2626. The base assembly 2504 further includes a post 2630 configured to couple to the bearing 2614, which enables the inner housing 2626 and components coupled thereto (e.g., the electrode PCB 2620, the dome PCB 2610, the dome switch 2608, the conductive cap 2606, the ring adhesive 2604, the conductive decorative ring 2602) to rotate relative to the post 2630.

In some embodiments, the connection springs 2616 are configured to connect the dome PCB 2610 to the inner housing 2626. In some embodiments, the assembly may be secured to the base assembly 2504 using the starlock retainer 2612 and the connection springs 2616. In some embodiments, however, solder may be used to connect the dome PCB 2610 to the electrode PCB 2620. A relatively thin bearing 2614, in some embodiments 1-2 mm thick, may be used to reduce the overall height of the KoD device 2500. In some embodiments, rather than using a bearing 2614, an interface between two different plastics may be used as a bearing, which may be a relatively low-cost implementation. As indicated above the overall height of the KoD device should preferably not exceed 10 mm.

The at least one electrode of the electrode PCB 2620 (e.g., the push electrode pad 2310, the rotation electrode pad 2312 of FIG. 20) may be sensed through the base assembly 2504 and the adhesive 2624. The thickness of the base assembly 2504 may impact performance as the base assembly becomes an extension to the touch sensor surface.

Figure 21E:
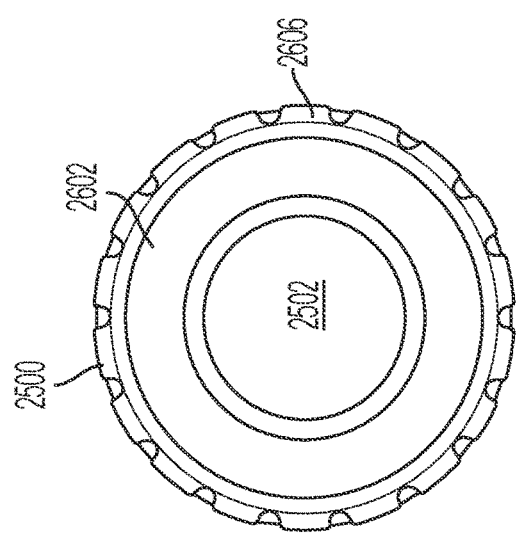
Figure 21H:
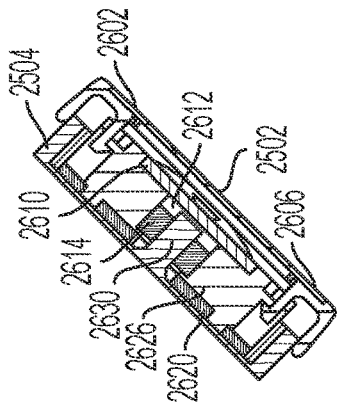
Figure 21D:
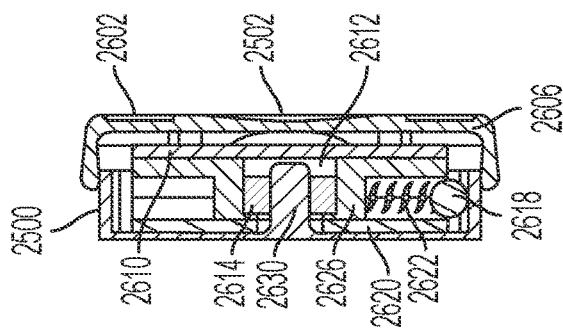
Figure 21G:
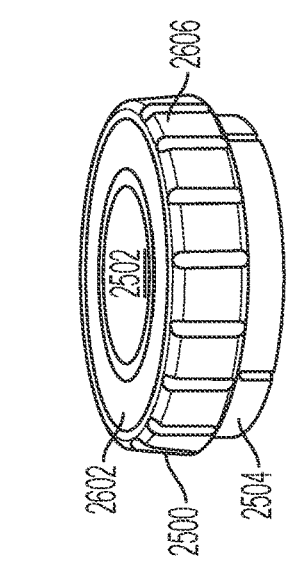
Figure 21C:
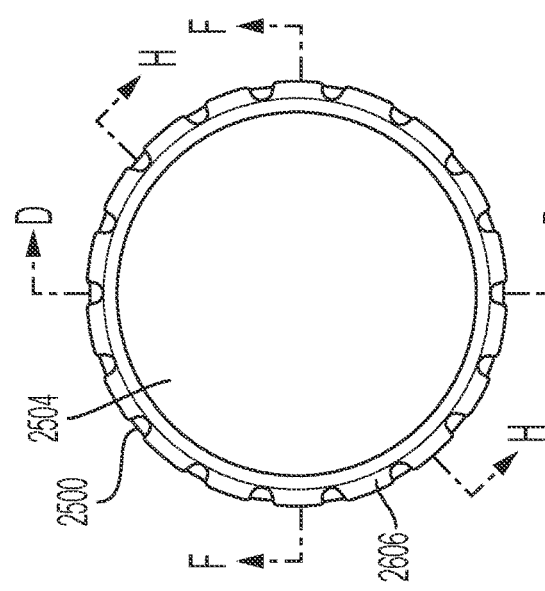
Figure 21F:
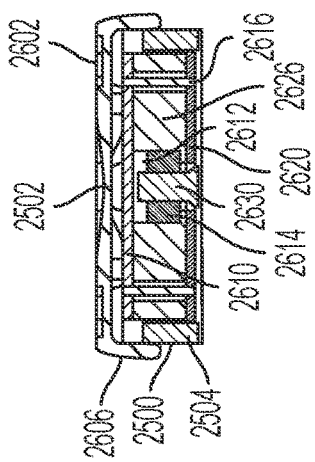

FIGS. 21C-21H illustrate various views of the KoD device, with the callouts as identified above. FIG. 21C is a bottom view, FIG. 21E is a top view, and FIG. 21G a perspective view of the KoD device 2500. FIG. 21D is a cross-sectional view taken through cross-section D-D of FIG. 21C, FIG. 21F is a cross-sectional view taken through cross-section F-F of FIG. 21C, and FIG. 21H is a cross-sectional view taken through cross-section H-H of FIG. 21C.

FIGS. 21I and 21J are cross-sectional views of the KoD device 2500. FIG. 21I illustrates the detent ball 2618 in engagement with the detents 2628 of an inner wall of a side wall 2812 of the base assembly 2504. The detent spring 2622 is configured to apply an outward force to the detent ball 2618 to maintain engagement between the detent ball 2618 and the detents 2628. FIG. 21I also illustrates the adhesive 2624 applied to (carried by) the side 2506 of the base assembly 2504 that is configured to face the touch screen device. By way of non-limiting example, the adhesive 2624 may be configured to span at least substantially the entire side 2506 of the base assembly 2504, as illustrated in FIG. 21I. Also, by way of non-limiting example, a thickness 2810 of the base assembly 2504 may be substantially 0.5 mm or less.

As illustrated in FIG. 21J, the KoD device 2500 may include at least one seal 2806 between the base assembly 2504 and the conductive cap 2606 to prevent foreign materials from entering into the KoD device 2500. In some embodiments, the conductive cap 2606 includes one or more clips 2808 configured to secure the conductive cap 2606 to the inner housing 2626, as illustrated in FIG. 21J.

Figure 22A:
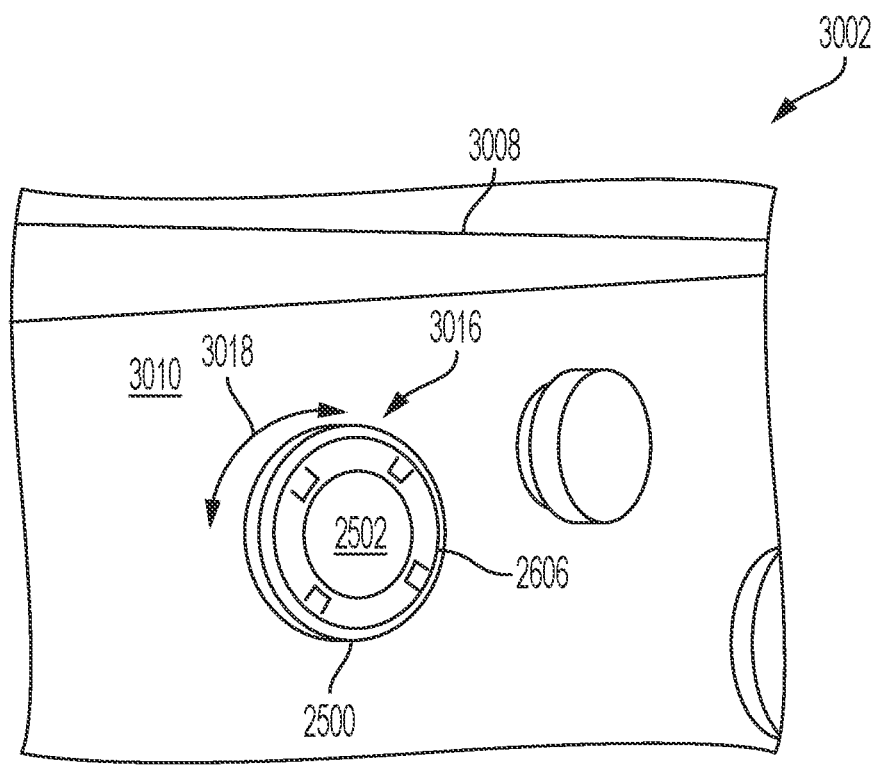
FIGS. 22A and 22B are views of a KoD system similar to the KoD system of FIG. 20.
Figure 22B:
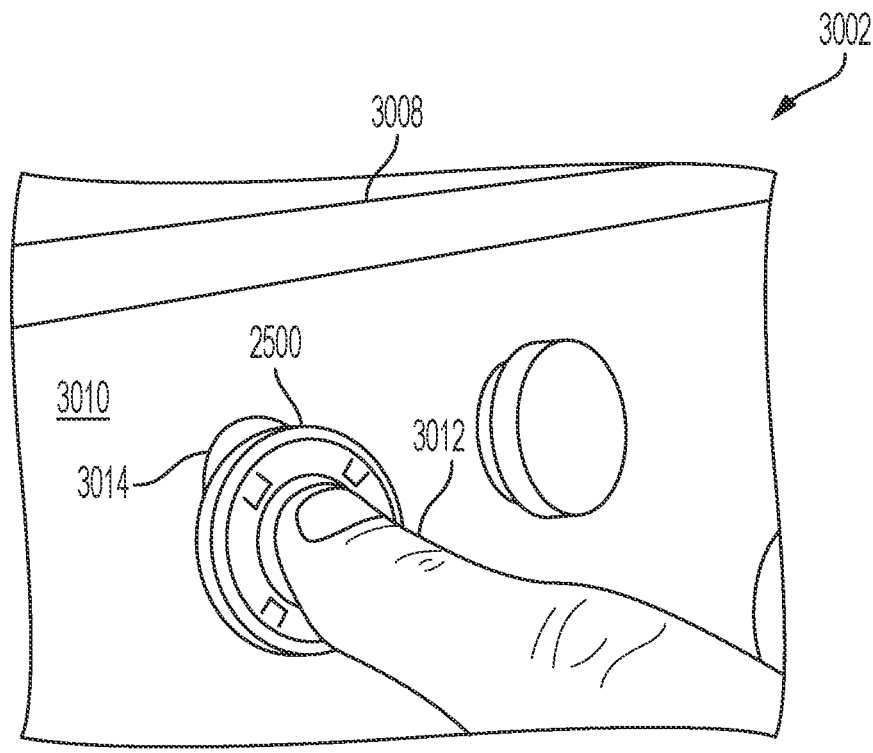

FIGS. 22A and 22B are views of a KoD system 3002 similar to the KoD system 2300 of FIG. 20. The KoD system includes a touch screen device 3008 similar to the touch screen device 2304 of FIG. 20. The touch screen device 3008 includes a touch screen 3010 similar to the touch screen 2320 of FIG. 20. The touch screen device 3008 also includes a touch sensor and control circuitry (not shown) similar to the touch sensor 2306 and control circuitry 2308 of FIG. 20. The KoD system 3002 further includes the KoD device 2500 of FIG. 21A secured to the touch screen 3010. By way of non-limiting example, the base assembly 2504 (not shown) of the KoD device 2500 may be secured to the touch screen 3010 using the adhesive 2624 (FIG. 21B). A rotation 3018 of the conductive cap 2606 may cause a rotation electrode pad of the KoD device 2500 to rotate with the conductive cap 2606. A push electrode pad and the rotation electrode pad of the KoD device 2500 may be in engagement proximity 3016 to the touch sensor of the touch screen device 3008.

FIG. 22B illustrates a finger 3012 of a user contacting the touch surface 2502 of the KoD device 2500. Responsive to the finger 3012 contacting the touch surface 2502 the touch screen device 3008 is arranged to display a ring 3014 on the touch screen 3010 corresponding to a detection of one or more of the push electrode pad and the rotation electrode pad. This detection results from the electrical connection of the touch surface 2502 to the rotation electrode pad and the switchable connection of the touch surface 2502 to the push electrode pad as discussed above. Accordingly, the KoD device 2500 is configured to electrically connect the finger 3012 to one or more of the push electrode pad and the rotation electrode pad.

Firmware of control circuitry (e.g., the control circuitry 2308 of FIG. 20) of the touch screen device 3008 may be tuned based on sensitivity performance of the KoD device 2500 given the presence of the base assembly 2504 to provide adequate performance.

Figure 23:
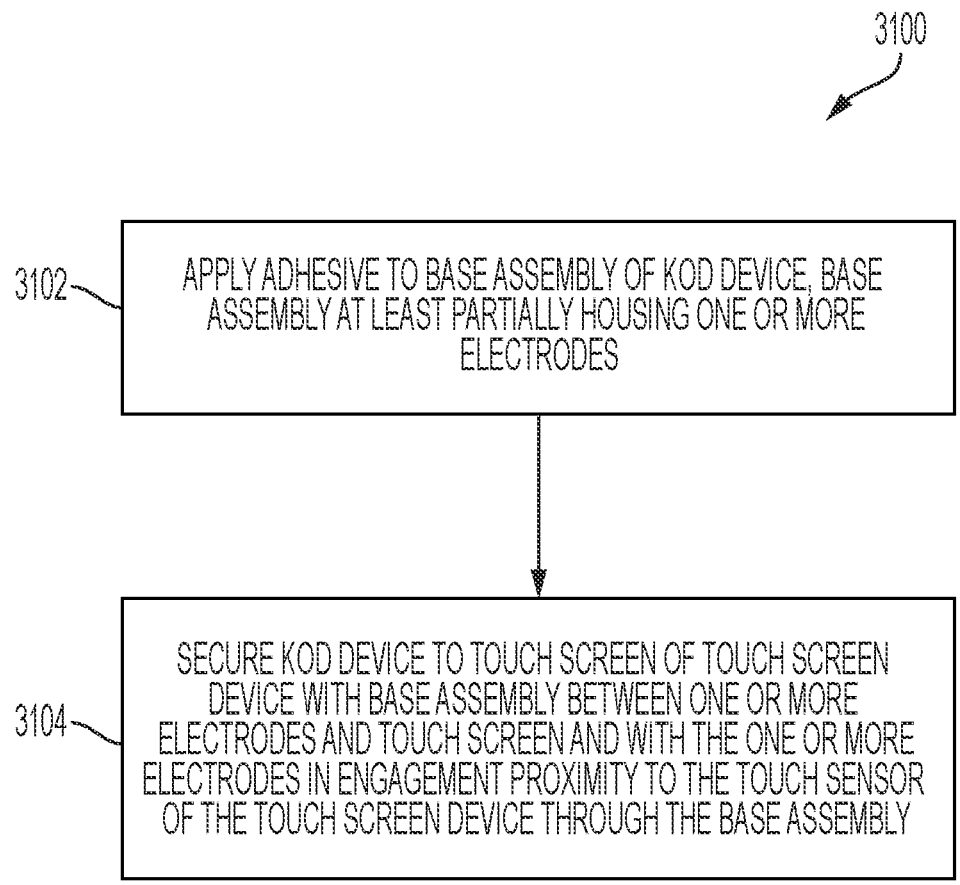
FIG. 23 is a flowchart illustrating a method of assembling a KoD system, according to some embodiments.

FIG. 23 is a flowchart illustrating a method 3100 of assembling a KoD system (e.g., the KoD system 2300 of FIG. 20), according to some embodiments. In operation 3102, method 3100 includes applying an adhesive (e.g., adhesive 2624 of FIG. 21B) to a base assembly (e.g., base assembly 2318 of FIG. 20, base assembly 2504 of FIG. 21A) of a KoD device (e.g., KoD device 2302 of FIG. 20, KoD device 2500 of FIG. 21A), the base assembly at least partially housing one or more electrodes (e.g., the push electrode pad 2310 and/or the rotation electrode pad 2312 of FIG. 20) configured to interact with a touch sensor (e.g., touch sensor 2306 of FIG. 20) of a touch screen device (e.g., touch screen device 2304 of FIG. 20, touch screen device 3008 of FIGS. 22A and 22B). By way of non-limiting example, FIG. 21B illustrates an adhesive 2624 to be applied to a base assembly 2504. In some embodiments, applying the adhesive to the base assembly includes applying the adhesive to substantially an entire surface of the base assembly that is configured to face the touch screen device.

In operation 3104, method 3100 includes securing the KoD device to a touch screen of the touch screen device with the base assembly between the one or more electrodes and the touch screen. By way of non-limiting example, FIGS. 22A and 22B illustrate a KoD device 2500 secured to a touch screen device 3008 via the adhesive 2624 of FIG. 21B.

Figure 24:
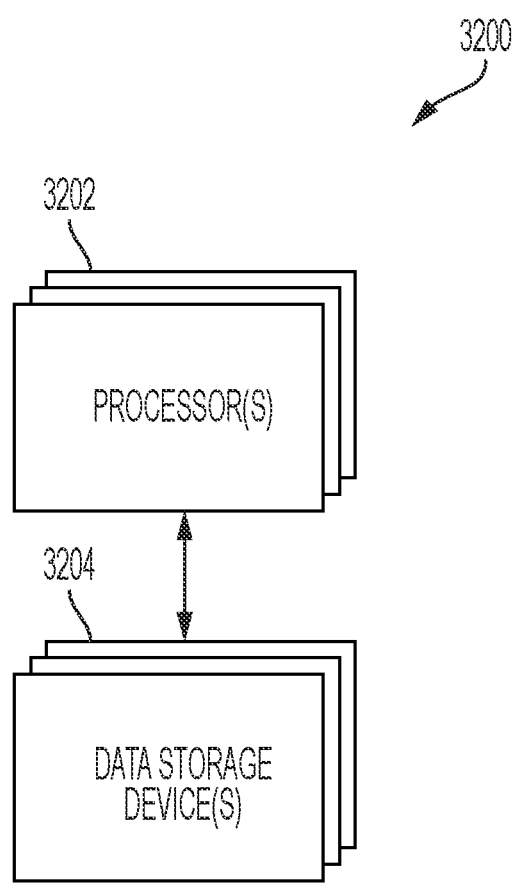
FIG. 24 is a block diagram of a computing device that may be used in some embodiments.

FIG. 24 is a block diagram of a computing device 3200 that may be used in some embodiments. The computing device 3200 includes one or more processors 3202 (sometimes referred to herein as "processors 3202") operably coupled to one or more data storage devices (sometimes referred to herein as "storage 3204"). The storage 3204 includes computer-readable instructions (e.g., software, firmware) stored thereon. The computer-readable instructions are configured to instruct the processors 3202 to perform operations of embodiments disclosed herein. By way of non-limiting examples, the computer-readable instructions may be configured to instruct the processors 3202 to perform at least a portion or a totality of the control circuitry 108 of FIG. 1, and/or of the control circuitry 2308 of FIG. 20.

In some embodiments, the processors 3202 include a central processing unit (CPU), a microcontroller, a programmable logic controller (PLC), other programmable device, or any combination thereof. In some embodiments, the storage 3204 includes volatile data storage (e.g., random-access memory (RAM)), non-volatile data storage (e.g., Flash memory, a hard disc drive, a solid-state drive, erasable programmable read-only memory (EPROM), without limitation). In some embodiments, the processors 3202 are configured to transfer computer-readable instructions stored in non-volatile data storage to volatile data storage for execution. In some embodiments, the processors 3202 and the storage 3204 may be implemented into a single device (e.g., a semiconductor device product, a system on chip (SOC)).

It should be noted that care should be taken to avoid capacitive coupling between a dome switch and a push electrode pad from triggering a false push detection. If this capacitance is at least four times (or even ten times) less than the electrode node capacitance in the depressed state, false detects should be minimal or eliminated. Also, care should be taken to avoid placing a center dome too close to a touch screen thereby interfering with the touch screen. Further, for extremely low profile KoDs, care should be taken to keep the touch surface out of the engagement proximity of the touch sensor, especially in the released position to avoid the touch surface itself triggering a touch by the touch sensor. Furthermore, in KoDs having relatively large diameters, multiple push electrode pads around the diameter may be used. Responsive to a push on the KoD, a push electrode pad nearest to the location of the push may be electrically connected to a touch surface of the KoD.

EXAMPLES

A non-exhaustive, non-limiting list of example embodiments follows. Not each of the example embodiments listed below are explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A knob on display (KoD) device, comprising: a touch surface comprising a conductive material, the touch surface configured to be positioned in a released position by default and in a depressed position responsive to pressure applied to the touch surface; and a push electrode pad configured to be positioned in engagement proximity to a touch sensor of a touch screen device in both the released position and the depressed position, the push electrode pad electrically connected to the conductive material of the touch surface responsive to the depressed position and electrically isolated from the conductive material of the touch surface in the released position.

Example 2: The KoD device of Example 1, further comprising a rotation electrode pad configured to be positioned in engagement proximity to the touch sensor of the touch screen device in both the released position and the depressed position, the rotation electrode pad electrically connected to the conductive material of the touch surface in both the released position and the depressed position.

Example 3: The KoD device of Example 2, further comprising a flexible printed circuit configured to electrically connect the push electrode pad and the rotation electrode pad to the touch surface.

Example 4: The KoD device of Example 2, further comprising a printed circuit board configured to electrically connect the push electrode pad and the rotation electrode pad to the touch surface.

Example 5: The KoD device of Example 2, further comprising a folded flexible printed circuit configured to electrically connect the push electrode pad and the rotation electrode pad to the touch surface.

Example 6: The KoD device of Example 2, further comprising a conductive overmold including the push electrode pad and the rotation electrode pad.

Example 7: The KoD device according to any one of Examples 1-6, wherein a distance between the released position of the touch surface and the depressed position of the touch surface is less than one millimeter (1 mm) (e.g., 0.3-0.5 mm).

Example 8: The KoD device according to any one of Examples 1-7, wherein a distance between the released position of the touch surface and the depressed position of the touch surface is between three tenths of a millimeter (0.3 mm) and five millimeters (5 mm).

Example 9: The KoD device according to any one of Examples 1-8, wherein the push electrode pad is configured to remain in an electrically floating state responsive to the touch surface being in the released position.

Example 10: The KoD device according to any one of Examples 1-9, further comprising a switch configured to selectively operably couple the push electrode pad to the conductive material of the touch surface responsive to the depressed position.

Example 11: The KoD device of Example 10, wherein the switch comprises a dome switch.

Example 12: A knob on display (KoD) device, comprising: at least one electrode comprising an electrically conductive material, the at least one electrode configured to be positioned in engagement proximity to a touch sensor of a touch screen device; and a base assembly configured to be positioned between a touch screen of the touch screen device and the at least one electrode, the at least one electrode configured to interact with the touch sensor through the base assembly.

Example 13: The KoD device of Example 12, wherein the base assembly is configured to carry an adhesive on a touch sensor side of the base assembly that is opposite to the at least one electrode to secure the KoD device to the touch screen of the touch screen device.

Example 14: The KoD device of Example 13, wherein at least substantially the entire touch sensor side of the base assembly is configured to carry the adhesive.

Example 15: The KoD device according to any one of Examples 12-14, wherein the base assembly is configured to at least partially cover an end of the KoD device that includes the at least one electrode.

Example 16: The KoD device according to any one of Examples 12-15, wherein the base assembly is about 0.5 millimeters thick (0.5 mm).

Example 17: The KoD device according to any one of Examples 12-16, wherein the base assembly includes one or more side walls extending toward a conductive cap of the KoD device.

Example 18: The KoD device of Example 17, further comprising one or more seals between the one or more side walls of the base assembly and the conductive cap of the KoD device.

Example 19: The KoD device according to any one of Examples 12-18, wherein the at least one electrode includes a push electrode pad configured to interact with the touch sensor responsive to a user pressing a conductive cap of the KoD device.

Example 20: The KoD device according to any one of Examples 12-19, wherein the at least one electrode includes a rotation electrode pad configured to rotate within engagement proximity of the touch sensor responsive to a user rotating the conductive cap of the KoD device.

Example 21: A vehicle including a KoD system, the KoD system comprising the touch screen device and the KoD device according to any one of Examples 12-20.

Example 22: A knob on display (KoD) device, comprising: at least one electrode comprising an electrically conductive material, the at least one electrode configured to be positioned in engagement proximity to a touch screen of a touch screen device; and a base assembly configured to be positioned between the touch screen of the touch screen device and the at least one electrode, the at least one electrode configured to be positioned in engagement proximity to the touch screen of the touch screen device through the base assembly.

Example 23: The KoD device of Example 22, further comprising an adhesive on a side of the base assembly that is opposite to the at least one electrode to secure the KoD device to the touch screen of the touch screen device.

Example 24: The KoD device of Example 23, wherein the adhesive is applied to at least substantially the entire side of the base assembly that is opposite to the at least one electrode such that the adhesive is the same size as the entire side of the base assembly that is opposite to the at least one electrode.

Example 25: The KoD device according to any one of Examples 22-24, wherein the base assembly is configured to at least partially cover an end of the KoD device.

Example 26: The KoD device according to any one of Examples 22-25, wherein the base assembly exhibits a thickness of 0.5 millimeters or less.

Example 27: The KoD device according to any one of Examples 22-26, wherein the base assembly includes one or more side walls extending toward a conductive cap of the KoD device.

Example 28: The KoD device of Example 27, further comprising one or more seals between the one or more side walls of the base assembly and the conductive cap of the KoD device.

Example 29: The KoD device according to any one of Examples 22-28, wherein the at least one electrode includes a push electrode pad configured to interact with the touch sensor responsive to a conductive cap of the KoD device being depressed.

Example 30: The KoD device according to any one of Examples 22-29, wherein the at least one electrode includes a rotation electrode pad configured to rotate within the engagement proximity of the touch sensor responsive to a rotation of the conductive cap of the KoD device.

Example 31: The KoD device according to any one of Examples 22-30, further comprising: an inner housing coupled to the at least one electrode; and a bearing coupled to the inner housing; wherein the base assembly comprises a post coupled to the bearing to enable the inner housing and the at least one electrode to rotate about the post.

Example 32: The KoD device of Example 31, wherein the base assembly comprises detents and the inner housing includes one or more detent actuators to provide mechanical resistance to rotation of the inner housing about the post.

Example 33: A knob on display (KoD) system, comprising: a touch screen device comprising a touch sensor and a touch screen; and a KoD device including: a base assembly secured to the touch screen of the touch screen device; and one or more electrodes positioned in engagement proximity to the touch sensor of the touch screen device through the base assembly.

Example 34: The KoD system of Example 33, wherein: the base assembly includes a post extending therefrom; and the KoD device further includes an inner housing coupled to the one or more electrodes, the base assembly configured to at least partially house the inner housing, the inner housing and the one or more electrodes configured to rotate about the post of the base assembly.

Example 35: The KoD system according to any one of Examples 33-34, wherein the touch screen device further comprises control circuitry configured to control the touch screen device to display a plurality of different graphical user interfaces the KoD device is configured to interact with.

Example 36: The KoD system according to any one of Examples 33-35, wherein the base assembly is secured to the touch screen using an adhesive.

Example 37: The KoD system of Example 36, wherein the adhesive spans at least substantially an entire surface of the base assembly that faces the touch screen.

Example 38: The KoD system according to any one of Examples 33-37, wherein the KoD device further comprises a touch surface that is electrically connected to a push electrode pad of the one or more electrodes responsive to a first position of the KoD device, the touch surface electrically isolated from the push electrode pad responsive to a second position of the KoD device.

Example 39: The KoD system of Example 38, wherein the one or more electrodes include a rotation electrode pad configured to be electrically connected to a touch surface of the KoD device regardless of the first position of the KoD device and the second position of the KoD device.

Example 39A: The KoD system according to any one of Examples 33-39, wherein the one or more electrodes include a rotation electrode pad configured to be electrically connected to a touch surface of the KoD device regardless of a depressed position of the KoD device and a released position of the KoD device.

Example 40: A method of assembling a knob on display (KoD) system, the method comprising: applying an adhesive to a base assembly of a KoD device, the base assembly at least partially housing one or more electrodes; and securing the KoD device to a touch screen of a touch screen device with the base assembly between the one or more electrodes and the touch screen and with the one or more electrodes positioned in engagement proximity to the touch sensor of the touch screen device through the base assembly.

Example 41: The method of Example 40, wherein applying the adhesive to the base assembly comprises applying the adhesive to substantially an entire surface of the base assembly that is configured to face the touch screen.

Example 41A: The method of Example 40, wherein the one or more electrodes are positioned at a fixed distance from the touch sensor of the touch screen device.

Example 42: A knob on display (KoD) device, comprising: a touch surface comprising a conductive material, the touch surface configured to be positioned in a released position and in a depressed position; and a push electrode pad configured to be positioned in engagement proximity to a touch sensor of a touch screen device in both the released position and the depressed position, the push electrode pad electrically connected to the conductive material of the touch surface responsive to one of the depressed position and the released position and electrically isolated from the conductive material of the touch surface in the other of the depressed position and the released position.

Example 42A: The KoD device of Example 40, wherein the push electrode pad is electrically connected to the conductive material of the touch surface responsive to the depressed position and electrically isolated from the conductive material of the touch surface in the released position.

Example 43: The KoD device of Example 42, further comprising a rotation electrode pad configured to be positioned in engagement proximity to the touch sensor of the touch screen device in both the released position and the depressed position, the rotation electrode pad electrically connected to the conductive material of the touch surface in both the released position and the depressed position.

Example 44: The KoD device of Example 43, further comprising a flexible printed circuit configured to electrically connect the push electrode pad and the rotation electrode pad to the touch surface responsive to the one of the depressed position and the released position.

Example 45: The KoD device of Example 43, further comprising a printed circuit board configured to electrically connect the push electrode pad and the rotation electrode pad to the touch surface responsive to the one of the depressed position and the released position.

Example 46: The KoD device of Example 43, further comprising a folded flexible printed circuit configured to electrically connect the push electrode pad and the rotation electrode pad to the touch surface responsive to the one of the depressed position and the released position.

Example 47: The KoD device of Example 43, further comprising a conductive overmold including the push electrode pad and the rotation electrode pad.

Example 48: The KoD device according to any one of Examples 43-47, further comprising a hub configured to secure to a touch screen of a touch screen device, the rotation electrode pad configured to rotate about the hub.

Example 49: The KoD device of Example 48, further comprising detent actuators mechanically coupled to the rotation electrode pad, wherein the hub includes detents configured to provide mechanical resistance against the detent actuators responsive to rotation of the detent actuators about the hub.

Example 50: The KoD device according to any one of Examples 42-49, wherein a distance between the released position of the touch surface and the depressed position of the touch surface is less one millimeter (1 mm) (e.g., 0.3-0.5 mm).

Example 51: The KoD device according to any one of Examples 42-50, wherein a distance between the released position of the touch surface and the depressed position of the touch surface is between 0.3 and 0.5 millimeter (0.3-0.5 mm).

Example 52: The KoD device according to any one of Examples 42-51, wherein the push electrode pad is configured to remain in an electrically floating state responsive to the touch surface being in the released position.

Example 53: The KoD device according to any one of Examples 42-52, further comprising a switch configured to selectively operably couple the push electrode pad to the conductive material of the touch surface responsive to the depressed position.

Example 54: The KoD device of Example 53, wherein the switch comprises a dome switch.

Example 55: A method of operating a knob on display (KoD) device, the method comprising: electrically connecting a touch surface of a KoD device to a rotation electrode pad regardless of a depressed position of the KoD device or a released position of the KoD device; electrically connecting the touch surface to a push electrode pad of the KoD device responsive to the depressed position of the KoD device; and electrically isolating the touch surface from the push electrode pad of the KoD device responsive to the released position of the KoD device.

Example 56: The method of Example 55, further comprising maintaining the push electrode pad and the rotation electrode pad a constant distance from a touch screen of a touch screen device regardless of the depressed position and the released position of the KoD device.

Example 57: The method according to any one of Examples 55-56, wherein electrically connecting the touch surface to the push electrode pad responsive to the depressed position comprises contacting the dome switch to a push contact responsive to depression of the dome switch to the push contact, the dome switch electrically connected to the touch surface, the push contact electrically connected to the push electrode pad.

Example 58: The method according to any one of Examples 55-57, wherein electrically isolating the touch surface from the push electrode pad responsive to the released position comprises electrically isolating a push contact from a dome switch, the dome switch electrically connected to the touch surface, the push contact electrically connected to the push electrode pad.

Example 59: A knob on display (KoD) system, comprising: a touch screen device including a touch screen and a touch sensor; and a KoD device secured to the touch screen, the KoD device comprising: a touch surface; and a push electrode pad and a rotation electrode pad configured to remain a constant distance from the touch screen regardless of a depressed position and a released position of the KoD device.

Example 60: The (KoD) system of Example 59, wherein the KoD device further comprises a hub secured to the touch screen, wherein the rotation electrode pad is configured to rotate about the hub responsive to rotation of the KoD device.

Example 61: The (KoD) system according to any one of Examples 59-60, wherein the rotation electrode pad is electrically connected to the touch surface regardless of the depressed position and the released position of the KoD device, and wherein the push electrode pad is electrically connected to the touch surface responsive to the depressed position and electrically isolated from the touch surface responsive to the released position.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   a touch surface comprising an electrically conductive material, the touch surface movable to a released position and to a depressed position;
   a dome switch pad comprising an electrically conductive material;
   a dome switch physically mounted to and electrically connected to the dome switch pad;

a rotation electrode pad in engagement proximity to a touch sensor of a touch screen device in both the released position and the depressed position; and an electrically conductive structure physically and electrically connected to the dome switch pad and the rotation electrode pad, the electrically conductive structure defining a continuous electrically conductive path from the rotation electrode pad, through the dome switch, to the electrically conductive material of the touch surface in both the released position and the depressed position.

2. The apparatus of claim 1, comprising:
a touch cap including the touch surface, the touch cap electrically connected to the dome switch.

3. The apparatus of claim 1, comprising:
a push electrode pad in engagement proximity to a touch sensor of a touch screen device in both the released position and the depressed position, the push electrode pad electrically isolated from the dome switch pad in the released position.

4. The apparatus of claim 3, comprising:
a push contact electrically connected to the push electrode pad, the push contact electrically connected, via the dome switch, to the electrically conductive material of the touch surface responsive to one of the depressed position and the released position, and electrically isolated from the electrically conductive material of the touch surface in the other of the depressed position and the released position.

5. The apparatus of claim 4, comprising:
comprising a printed circuit board electrically connecting the rotation electrode pad to the dome switch pad and electrically connecting the push electrode pad to the push contact.

6. The apparatus of claim 5, comprising: wherein the printed circuit board is a folded flexible printed circuit.

7. The apparatus of claim 3, comprising: an electrically conductive overmold including the rotation electrode pad and the push electrode pad.

8. The apparatus of claim 1, comprising: a hub to secure to a touch screen of the touch screen device, the rotation electrode pad rotatable about the hub.

9. The apparatus of claim 8, comprising:
detent actuators mechanically coupled to the rotation electrode pad, wherein the hub includes detents to provide mechanical resistance against the detent actuators responsive to rotation of the detent actuators about the hub.

10. The apparatus of claim 1, comprising:
a touch cap including the touch surface; and
a cushion to compress by the touch cap responsive to the depressed position of the touch surface.

11. The apparatus of claim 10, wherein the touch cap includes clips to secure the touch cap to a circuit board including the dome switch pad.

12. A method, comprising:
electrically connecting a touch surface of a KoD device to a rotation electrode pad regardless of a depressed position of the KoD device or a released position of the KoD device through a dome switch comprising an electrically conductive material physically mounted to a dome switch pad, the dome switch physically and electrically connected to the rotation electrode pad through an electrically conductive structure, the electrically conductive structure defining a continuous electrically conductive path from the rotation electrode pad, through the dome switch, to the touch surface of the KoD device;

electrically connecting, via the dome switch, the touch surface to the KoD device responsive to the depressed position of the KoD device; and electrically isolating the touch surface and the dome switch pad from the KoD device responsive to the released position of the KoD device.

13. The method of claim 12, wherein electrically connecting, via the dome switch, the touch surface to the KoD device comprises:
electrically connecting, via the dome switch and a push contact electrically connected to a push electrode pad of the KoD device, the touch surface to the push electrode pad of the KoD device.

14. The method of claim 13, comprising:
maintaining the push electrode pad and the rotation electrode pad a constant distance from a touch screen of a touch screen device regardless of the depressed position and the released position of the KoD device.

15. The method of claim 12, wherein electrically isolating the touch surface and the dome switch pad from the KoD device comprises:
electrically isolating the touch surface and the dome switch pad from a push electrode pad of the KoD device.

16. The method of claim 12, wherein electrically connecting, via the dome switch, the touch surface to the KoD device comprises:
contacting the dome switch to a push contact pad of the KoD device responsive to depression of the dome switch to the push contact pad, the dome switch electrically connected to the touch surface.

17. A system, comprising:
a touch screen device including a touch screen and a touch sensor; and
a KoD device secured to the touch screen, the KoD device comprising:
a dome switch pad;
a dome switch comprising an electrically conductive material physically mounted to and electrically connected to the dome switch pad;
a touch surface; and
a rotation electrode pad to remain a constant distance from the touch screen regardless of a depressed position and a released position of the KoD device, the rotation electrode pad and the dome switch pad physically and electrically connected to an electrically conductive structure, the electrically conductive structure defining a continuous conductive path from the rotation electrode pad to the touch surface through the dome switch pad and the dome switch.

18. The system of claim 17, wherein the KoD device comprises a hub secured to the touch screen, wherein the rotation electrode pad is rotatable about the hub responsive to rotation of the KoD device.

19. The system of claim 17, wherein the rotation electrode pad is electrically connected to the touch surface through the dome switch pad and the dome switch regardless of the depressed position and the released position of the KoD device.

20. The system of claim 19, wherein the KoD device comprising:
a push electrode pad; and
wherein a push contact electrically connected to the push electrode pad is electrically connected to the touch surface responsive to the depressed position and electrically isolated from the touch surface responsive to the released position.

21. The system of claim 20, wherein the push electrode pad is electrically isolated from the dome switch pad in the released position of the KoD device.

* * * * *